US012619216B2

(12) United States Patent
Dietz

(10) Patent No.: US 12,619,216 B2
(45) Date of Patent: May 5, 2026

(54) AUTOMATIC PROCESS CONTROL IN A GEAR PROCESSING MACHINE

(71) Applicant: REISHAUER AG, Wallisellen (CH)

(72) Inventor: Christian Dietz, Wallisellen (CH)

(73) Assignee: REISHAUER AG, Wallisellen (CH)

( * ) Notice: Subject to any disclaimer, the term of this patent is extended or adjusted under 35 U.S.C. 154(b) by 828 days.

(21) Appl. No.: 17/635,228

(22) PCT Filed: Sep. 4, 2020

(86) PCT No.: PCT/EP2020/074828
§ 371 (c)(1),
(2) Date: Feb. 14, 2022

(87) PCT Pub. No.: WO2021/048027
PCT Pub. Date: Mar. 18, 2021

(65) Prior Publication Data
US 2022/0291669 A1 Sep. 15, 2022

(30) Foreign Application Priority Data
Sep. 13, 2019 (CH) ...................................... 1158/19

(51) Int. Cl.
*G05B 19/418* (2006.01)
*B23F 23/12* (2006.01)

(52) U.S. Cl.
CPC .... *G05B 19/41825* (2013.01); *B23F 23/1218* (2013.01)

(58) Field of Classification Search
CPC .... G05B 19/41825; G05B 2219/49307; G05B 19/406; G05B 19/404; G05B 19/41865;
(Continued)

(56) References Cited

U.S. PATENT DOCUMENTS 3,809,970 A 5/1974 Cook
4,123,878 A 11/1978 Lizotte
(Continued)

FOREIGN PATENT DOCUMENTS

CH 713 798 A1 11/2018
CN 101813931 A 8/2010
(Continued)

OTHER PUBLICATIONS

H. Schriefer et al., "Continuous Generating Gear Grinding Machines and Information from Industrial Practice", Reishauer AG, 2010, pp. 119-122, 153-199, 542-551, 319-322, ISBN 978-3-033-02535-6.
(Continued)

*Primary Examiner* — Zhipeng Wang
(74) *Attorney, Agent, or Firm* — Sughrue Mion, PLLC

(57) ABSTRACT

A method for monitoring a machining process in which tooth flanks of pre-toothed workpieces (23) are machined with a finishing machine (1) is disclosed. As part of the method, a plurality of measurement values are recorded while a finishing tool (16) is in machining engagement with a workpiece. Among them are values of a power indicator which indicates a current power consumption of the tool spindle during the machining of the tooth flanks of the workpiece. A normalization operation is applied to at least some of the measurement values or to values of a quantity derived from the measurement values in order to obtain normalized values. The normalization operation depends on at least one of the following parameters: geometrical parameters of the finishing tool, in particular its outside diameter, geometrical parameters of the workpiece and setting parameters of the finishing machine, in particular radial infeed and axial feed.

38 Claims, 12 Drawing Sheets

(58) Field of Classification Search

CPC ....... G05B 2219/32252; B23F 23/1218; G06F 17/175

See application file for complete search history.

(56) References Cited

U.S. PATENT DOCUMENTS

| | | | |
|---|---|---|---|
| 4,894,644 | A | 1/1990 | Thomas |
| 5,070,655 | A | 12/1991 | Aggarwal |
| 6,577,917 | B1 | 6/2003 | Ronneberger |
| 9,448,552 | B2 | 9/2016 | Uenishi |
| 2006/0111018 | A1 | 5/2006 | Kopp et al. |
| 2010/0228384 | A1 | 9/2010 | Neumaier et al. |
| 2011/0301742 | A1* | 12/2011 | Mundt ................... B23Q 15/12 700/173 |
| 2012/0156963 | A1* | 6/2012 | Vogler ................. G05B 19/406 451/5 |
| 2016/0091886 | A1 | 3/2016 | Sato et al. |
| 2018/0264613 | A1* | 9/2018 | Tamai ................... B23Q 17/007 |
| 2018/0307203 | A1 | 10/2018 | Aizawa et al. |
| 2019/0101891 | A1 | 4/2019 | Iijima et al. |
| 2019/0196417 | A1 | 6/2019 | Uno |
| 2020/0180104 | A1 | 6/2020 | Hug et al. |

FOREIGN PATENT DOCUMENTS

| | | | |
|---|---|---|---|
| CN | 202344052 | U | 7/2012 |
| CN | 103645052 | A | 3/2014 |
| DE | 102014015587 | A1 | 4/2016 |
| JP | 61-26469 | B2 | 6/1986 |
| JP | 04-106145 | U | 9/1992 |
| JP | 2019-67136 | A | 4/2019 |
| WO | 95/11488 | A1 | 4/1995 |
| WO | 2017/194251 | A1 | 11/2017 |

OTHER PUBLICATIONS

"NORDMANN Tool Monitoring", version dated Oct. 5, 2017, accessed on Feb. 25, 2019 URL: https://www.nordmann.eu/pdf/praesentation/Nordmann_presentation_ENG.pdf, 106 pages.

Dr. Ing. Klaus Nordman, "Prozessüberwachung beim Schleifen und Abrichten" ("Process Monitoring during Grinding and Dressing"), Schleifen + Polieren May 2004, pp. 52-56.

C. Dietz, "Numerische Simulation des kontinuierlichen Wälzschleifprozesses unter Berücksichtigung des dynamischen Verhaltens des Systems Maschine—Werkzeug—Werkstück" ("Numeric Simulation of Continuous Generating Grinding taking into Account the Dynamic Response of the System Machine—Tool—Workpiece"), Diss. ETH Zurich No. 24172, URL: https://doi.org/10.3929/ethz-b-000171605, 2017, 158 pages.

International Search Report of PCT/EP2020/074828 dated Nov. 23, 2020 [PCT/ISA/210].

Extended European Search Report dated Nov. 30, 2022 in European Application No. 22190820.5.

Chinese Search Report issued Mar. 1, 2024 in Application No. 202080064419.7.

Chinese Office Action issued Mar. 1, 2024 in Application No. 202080064419.7.

Huanyu Li, "The Optimization of Milling Process parameters for Rough Milling based on spindle power", China Master's Theses Full-Text Database Engineering Science and Technology I, Jul. 2018, pp. 1-10 (10 pages total).

Wang Zhiyoung, et al., "Fault diagnosis of gear milling machine based on frequency-domain analysis of vibration signal", Manufacturing & Technology Tool, Mar. 2018, pp. 114-121 (8 pages).

Chinese Office Action dated Jun. 1, 2023 in Application No. 202080064419.7.

Communication issued Jul. 19, 2024 in European Application No. 22 190 820.5.

Translation of Communication issued May 28, 2024 in Taiwanese Application No. 109129751.

Translation of Communication issued Sep. 24, 2024 in Japanese Application No. 2022-510948.

Communication issued Aug. 26, 2025 in Japanese Application No. 2022-510948.

Communication dated Mar. 13, 2026 in Indian Application No. 202217005635.

* cited by examiner

110   Setting up the machine

111   Dressing

112   Calculating the normalization factor

120   Processing of a workpiece

121   Recording measurement variables

122   Normalization operation

123   Fault detection

124   Calculation of characteristic parameters

125   Removal of faulty workpieces

126   Storing of a data set

131 — Reading of data sets

132 — AI algorithm
Identification of a process deviation

133 — Correction of machining process

Web browser

141 — Reading out of data sets

142 — Graphical output

AUTOMATIC PROCESS CONTROL IN A GEAR PROCESSING MACHINE

CROSS REFERENCE TO RELATED APPLICATIONS

This application is a National Stage of International Application No. PCT/EP2020/074828 filed on Sep. 4, 2020, claiming priority based on Swiss Patent Application No. 01158/19 filed on Sep. 13, 2019.

TECHNICAL FIELD

The present invention relates to a method for monitoring a machine for finishing gears, in particular a machine for carrying out a generating process. The invention further relates to a finishing machine configured to carry out such a method, a computer program for carrying out such a method and a computer-readable medium comprising such a computer program.

STATE OF THE ART

Hard fine machining (hard finishing) of pre-machined gears is a very demanding method, where even the slightest deviation from the process specifications can result in the machined workpieces being considered scrap ("NIO parts", where NIO means "not in order"). This problem can be illustrated particularly well by the example of continuous generating grinding, but also applies equally to other generating finishing methods such as single flank generating grinding, gear honing or hard skiving. To a lesser extent, similar problems also arise for non-generating methods such as discontinuous or continuous profile grinding.

In continuous generating grinding, a pre-machined gear blank is machined in rolling engagement with a worm-shaped profiled grinding wheel (grinding worm). Generating grinding is a very demanding, generating machining method, which is based on a large number of synchronized, high-precision individual movements and is influenced by many boundary conditions. Information on the fundamentals of continuous generating grinding can be found, for example, in the book by H. Schriefer et al., "Continuous Generating Gear Grinding", published by Reishauer AG, Wallisellen 2010, ISBN 978-3-033-02535-6, in Chapter 2.3 ("Basic Methods of Generating Grinding"), pages 121 to 129.

Theoretically, the tooth flank shape in continuous generating grinding is determined solely by the dressed profile shape of the grinding worm and the setting data of the machine. In practice, however, deviations from the ideal condition occur in automated production, which can have a decisive influence on the grinding results.

Traditionally, the quality of gears produced by the generating grinding method is only assessed after the end of the machining process by gear measurements outside the machine ("offline") using a large number of measured variables. There are various standards that prescribe how the gears are to be measured and how it is to be checked whether the measurement results are within or outside a tolerance specification. A summary of such gear measurements can be found, for example, in the aforementioned book by Schriefer et al. in Chapter 3 ("Quality Assurance in Continuous Generating Gear Grinding") on pages 155 to 200.

It is known from the state of the art to make corrections on the machine based on gear measurements in order to eliminate detected machining errors. In the above-mentioned book by Schriefer et al., this is discussed in Chapter 6.10 ("Analysing and Eliminating Gear Tooth Deviations") on pages 542 to 551.

Since, for reasons of time and cost, only random checks are usually carried out during gear inspection, machining errors are often detected very late. This can lead to the fact that, under certain circumstances, considerable parts of a production lot have to be discarded as NIO parts. It is therefore desirable to detect machining errors as early as possible "online" during machining, ideally before a machining error reaches such a degree that workpieces have to be rejected as NIO parts.

For this purpose, it is desirable to provide an automated process monitoring system which makes it possible to detect undesirable process deviations, to obtain indications of possible machining errors and to change the machine settings in a targeted manner so that these machining errors are avoided or at least reduced. Ideally, process monitoring should also allow conclusions to be drawn about process deviations retrospectively if machining errors are only detected later, e.g. during EOL testing (EOL=End of Line).

Until now, suitable strategies for automated process monitoring in gear machining are only rudimentarily known from the state of the art.

For example, it is known from DE 10 2014 015 587 A1 to monitor parameters on a gear machine and to carry out a gear check whenever certain measured machine parameters deviate from nominal values.

The company presentation "NORDMANN Tool Monitoring", version dated 5 Oct. 2017, accessed on 25 Feb. 2019 from https://www.nordmann.eu/pdf/praesentation/Nordmann_presentation_ENG.pdf, describes various measures for tool monitoring on general metal-cutting machining tools (page 3). The presentation shows examples of applications in various metal-cutting processes, including in brief a few examples of processes relevant to gear machining, in particular hobbing (pages 41 and 42), hard skiving (page 59) and honing (page 60). Continuous generating grinding is only mentioned in passing (e.g. pages 3 and 61).

Methods for automatic process monitoring in various machining processes are also known from the following documents, among others U.S. Pat. Nos. 5,070,655, 3,809,970, 4,894,644, and Klaus Nordmann, "Prozessüberwachung beim Schleifen und Abrichten" ("Process Monitoring during Grinding and Dressing"), Schleifen+Polieren May 2004, Fachverlag Möller, Velbert (DE), pages 52-56. However, here too, the fine machining of gears is not discussed in detail.

One difficulty of process monitoring in gear machining is the fact that the monitored measured variables depend in a highly complex way on a large number of geometric properties of the tool (in the case of a grinding worm, for example, diameter, module, number of starts, helix angle, etc.), geometric properties of the workpiece (for example, module, number of teeth, helix angle, etc.) and setting parameters on the machine (for example, radial infeed, axial feed, speeds of the tool and workpiece spindles, etc.). Due to these diverse, complex dependencies, it is on the one hand extremely demanding to draw direct conclusions from the monitored measured variables about concrete process deviations and the resulting machining errors. On the other hand, it is extremely difficult to compare the measured variables from different machining processes. An additional challenge arises when using dressable tools. Dressing causes the diameter of the tool to change during the machining of a series of workpieces, and thus the contact conditions also change. As a result, the monitored measured variables from different dressing cycles cannot be directly compared with each other even within the same series of workpieces, even if all other conditions remain the same.

Known process monitoring methods do not yet take these peculiarities of gear machining sufficiently into account.

SUMMARY OF THE INVENTION

It is an object of the present invention to provide a method for process monitoring in gear machining which makes it possible to detect process deviations and to counteract them in a targeted manner. The method should be particularly suitable for use with dressable tools.

This object is achieved by a method as claimed.

A method for monitoring a machining process is provided in which tooth flanks of pre-toothed workpieces are machined in a finishing machine (i.e., a machine for fine machining). The finishing machine comprises a tool spindle for driving a finishing tool (i.e., a fine machining tool) to rotate about a tool axis and a workpiece spindle for driving a pre-toothed workpiece to rotation. The method comprises:

detecting a plurality of measurement values while the finishing tool is in machining engagement with a workpiece; and applying a normalization operation to at least some of the measurement values or to values of a quantity derived from the measurement values to obtain normalized values, wherein the normalization operation depends on at least one process parameter, said at least one process parameter being selected from geometric parameters of the finishing tool, geometric parameters of the workpiece and setting parameters of the finishing machine.

It is thus proposed to record measurement values on the finishing machine and to subject at least some of these measurement values or values derived from them to a normalization (standardization) operation. The normalization operation takes into account the influence of one or more process parameters on the measurement values, in particular geometrical parameters of the finishing tool (in particular its dimensions, specifically in particular its outside diameter), geometrical parameters of the workpiece and/or setting parameters of the finishing machine (in particular radial infeed, axial feed and speeds of the tool and workpiece spindles). The resulting normalized values are thus independent of or at least much less dependent on the process parameters mentioned. Thanks to the normalization operation, the normalized values can be compared between different machining operations even if these process parameters differ.

The normalization operation is of particular importance when the measurement values include values of a power indicator which indicates the current power consumption of the tool spindle during the machining of the tooth flanks of the workpiece. In particular, the detected power indicator can be a measure of the current consumption of the tool spindle. Such a power indicator is particularly influenced by these parameters. It is therefore particularly advantageous to apply the normalization operation to the values of the power indicator or a variable derived from it.

The normalization operation is preferably based on a model that describes an expected dependence of the measurement values on the parameters mentioned. If the measurement values are the values of a power indicator, the model preferably describes the dependence of the process power (i.e. the mechanical or electrical power required for the machining process performed) on the parameters mentioned. In particular, the process power model may be based on a force model describing an expected dependence of the cutting force acting at the point of contact between the finishing tool and the workpiece on geometrical parameters of the finishing tool, geometrical parameters of the workpiece and setting parameters of the finishing machine. The process power model can also take into account the length of a lever arm that is effective between the tool axis and a contact point between the finishing tool and the workpiece. The lever arm length can be approximated in particular by the outside diameter of the finishing tool. In addition, the process power model can take into account the speed of the tool spindle.

The normalization operation can, for example, involve multiplying the measurement values acquired or variables derived from them by a normalization factor. However, more complex normalization operations are also conceivable. If the measurement values include the values of a power indicator, the normalization factor can be, in particular, an inverse power variable calculated on the basis of the process power model for the actual machining situation or a variable derived from it.

The normalization operation is preferably applied directly to the acquired measurement values, if necessary after filtering. The normalization operation is advantageously carried out in real time, i.e. during the machining process, in particular during the machining of the workpiece, i.e. while the finishing tool is still in machining engagement with the workpiece. This means that normalized values are available immediately during the machining process and can be used in real time to monitor the machining process.

In particular, it is advantageous if the normalized values are analyzed in real time in order to determine impermissible process deviations during the machining process. This makes it possible to identify workpieces for which an impermissible process deviation has been determined immediately after their machining and, if necessary, to remove them from the workpiece batch for separate treatment. For example, such workpieces can be subjected to a separate measurement or sorted out directly as NIO parts.

In preferred embodiments, the method comprises the calculation of characteristic parameters of the machining process from the measurement values or values derived from them. The calculation of characteristic parameters from measurement values or from values derived from them is advantageous regardless of whether a normalization operation is carried out as part of the process. In some embodiments, at least one of the characteristic parameters is a normalized characteristic parameter, i.e. at some point during the calculation of the characteristic parameter, the normalization operation is applied. This can be done by calculating the characteristic parameter from normalized measurement values. This can also be done by applying the normalization operation only to an intermediate result (i.e. to a quantity derived from the measurement values) when calculating the characteristic parameter.

At least one of the characteristic parameters is preferably specific to the machining process. It is therefore preferably not just a statistical quantity such as mean value, standard deviation, etc., which can be formed independently of the concrete machining process, but a parameter which takes into account the characteristics of the concrete machining process.

Preferably at least one of the characteristic parameters correlates with a predefined machining error of the workpiece. In particular, it is advantageous if there is a one-to-one relationship between the characteristic parameter and the size of the machining error, especially a simple proportionality. This makes it possible to obtain immediate information about the occurrence of a specific machining error by monitoring the characteristic parameter for different workpieces. This enables even inexperienced operators to interpret the characteristic parameters correctly and to take corrective action.

There are particular advantages when the characteristic parameters are directly related to the results of gear measurements. For this purpose, the method can include:

performing a gear measurement for selected workpieces in order to determine for each such workpiece at least one gear measurement value characterizing the predefined machining error; and determining of correlation parameters that characterize the correlation of the at least one characteristic parameter with the at least one gear measurement value.

The calculation of at least one of the characteristic parameters may in particular include a spectral analysis of measurement values, in particular of values of the (preferably normalized) power indicator and/or values of an acceleration sensor. In particular spectral components at multiples of the tool speed and/or workpiece speed are preferably evaluated. In this manner the calculation of the corresponding parameter is specific to the machining process. Such a spectral analysis is also advantageous if no normalization operation is performed, as may be the case, for example, with values from an acceleration sensor.

If the fine machining process is a generating process in which the fine machining tool and the workpiece are in rolling engagement, in particular a generating grinding process, it is advantageous if the characteristic parameters include at least one of the following variables:

an cumulative pitch indicator calculated by evaluating a spectral component of measurement values, in particular of the normalized power indicator, at the rotational speed of the workpiece spindle and correlating it with a cumulative pitch error of the workpiece, a profile shape indicator calculated by evaluating a spectral component of measurement values, in particular of an acceleration sensor, at the tooth mesh frequency and correlating it with a profile shape deviation of the workpiece.

It is also advantageous if the characteristic parameters include a wear indicator, wherein the wear indicator is calculated from a low-pass filtered spectral component of measurement values, in particular of the normalized power indicator, and correlates with a degree of wear of the fine machining tool.

It is advantageous to determine a process deviation of the machining process from a target process on the basis of the course of at least one of the characteristic parameters for a plurality of workpieces. For this purpose, advantageously selected values of a characteristic parameter are correlated with values of another characteristic parameter or another process variable. Advantageously, the machining process is then adjusted to reduce the process deviation, or limit values are adjusted, which are used in the context of the real-time analysis explained above to identify impermissible process deviations. The process deviation can be determined by a trained machine learning algorithm.

The method may include storing a data set in a database, the data set comprising a unique identifier of the workpiece, at least one process parameter and at least one of the characteristic parameters. Furthermore, the method may include:

retrieving data sets for a plurality of workpieces from the database; and graphical outputting of values of at least one of the characteristic parameters or values derived therefrom for the plurality of workpieces.

These steps can be performed in a web browser, for example, because the computing and memory requirements for these steps are very moderate compared to the processing of the raw data.

The method preferably provides for a recalculation of the normalization operation whenever at least one of the process parameters changes. The recalculation of the normalization operation then preferably involves the application of the said model with the changed process parameters.

The recalculation of the normalization operation may be based in particular on a changed dimension of the finishing tool, in particular of its outside diameter, and may include compensation in respect of the changed dimension. This is particularly important if this dimension is changed during the machining of a series of parts, as is regularly the case with dressable tools. In this way, characteristic parameters determined in different dressing cycles can be directly compared with each other.

The invention also provides a finishing machine for the machining of tooth flanks of pre-toothed workpieces. It comprises: a tool spindle for driving a finishing tool (fine machining tool) to rotate about a tool axis; a workpiece spindle for driving a pre-toothed workpiece to rotation; a control device for controlling a process of machining the workpiece with the finishing tool; and a process monitoring device. The process monitoring device is specifically configured to perform the above-described method.

For this purpose, the process monitoring device preferably comprises:

a detecting device for detecting a plurality of measurement values while the finishing tool is in machining engagement with a workpiece; and a normalization device for applying a normalization operation to at least part of the measurement values or to values of a quantity derived from the measurement values in order to obtain normalized values, wherein the normalization operation depends on at least one process parameter, said at least one process parameter being selected from geometric parameters of the finishing tool, geometric parameters of the workpiece and setting parameters of the finishing machine.

Preferably, the normalization device is configured to perform the normalization operation in real time while the finishing tool is in machining engagement with the workpiece.

In some embodiments, the process monitoring device comprises a fault detection device that is configured to analyze the normalized values in real time to detect impermissible process deviations.

The finishing machine may have a workpiece handling device configured to automatically remove workpieces for which an impermissible process deviation has been determined.

In some embodiments, the process monitoring device comprises a characteristic parameter calculation device for calculating characteristic parameters of the machining process from the measurement values or values derived from them. The characteristic parameter calculation device can be configured to carry out a spectral analysis of measurement values, values derived therefrom or normalized values for at least one of the characteristic parameters and in particular to evaluate spectral components at multiples of the speed of the tool spindle and/or the workpiece spindle.

The process monitoring device may comprise a data communication device for transmitting a data set to a database, the data set comprising a unique identifier of the workpiece, at least one process parameter and at least one of the characteristic parameters.

The process monitoring device may comprise a deviation detection device for detecting a process deviation of the machining process from a target process based on values of at least one of the characteristic parameters for a plurality of workpieces. The deviation detection device may comprise a processor device programmed to execute a trained machine learning algorithm to detect the process deviation.

The process monitoring device may include a normalization calculation device to recalculate the normalization operation when at least one of the process parameters changes. The normalization calculation device is preferably configured to apply a model to the recalculation of the normalization operation which describes an expected dependence of the measurement values on the process parameters, in particular a model of a process force or process power. The normalization calculation device can be advantageously configured to carry out a compensation with regard to a dimension of the finishing tool, in particular with regard to its outside diameter.

The detecting device, normalization device, fault detection device, characteristic parameter calculation device, normalization calculation device, deviation detection device and data communication device may be implemented at least partially in software for execution on one or more processors of the process monitoring device.

The present invention also provides a computer program. The computer program comprises instructions which cause a process monitoring device in a finishing machine of the type explained above, in particular one or more processors of the process monitoring device, to carry out the method explained above. The computer program may be stored in a suitable memory device, for example in a computer separate from the machine control.

Furthermore, the invention provides a computer-readable medium on which the computer program is stored. The medium may be a non-volatile medium, such as a flash memory, a CD, a hard disk, etc.

BRIEF DESCRIPTION OF THE DRAWINGS

Preferred embodiments of the invention are described in the following with reference to the drawings, which are for explanatory purposes only and are not to be interpreted as limiting. Shown in the drawings.

DESCRIPTION OF PREFERRED EMBODIMENTS

Exemplary Structure of a Generating Grinding Machine

Figure 1:
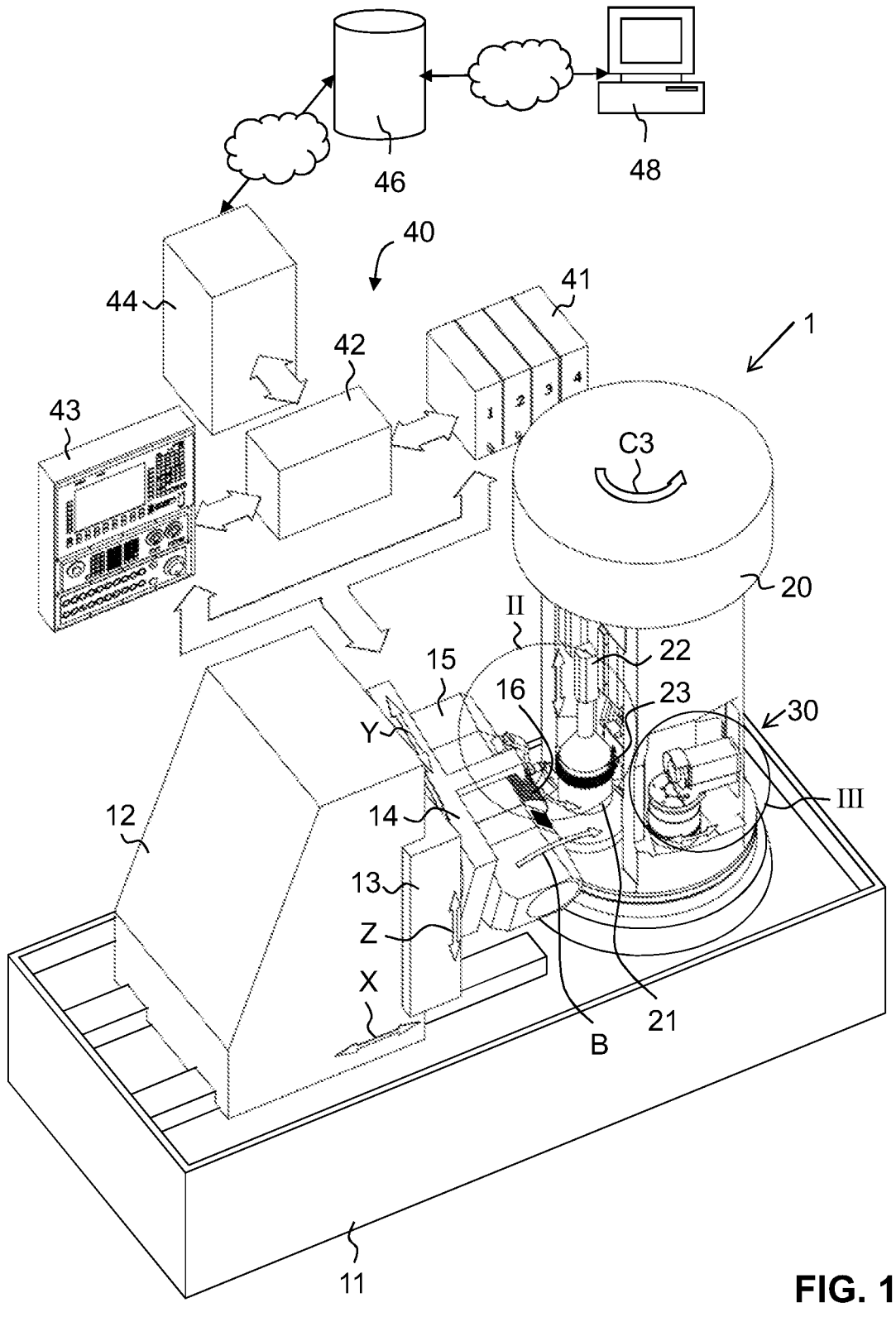
FIG. 1 a schematic view of a generating grinding machine.

FIG. 1 shows a generating grinding machine 1 as an example of a finishing machine for machining the tooth flanks of pre-toothed workpieces. The machine comprises a machine bed 11, on which a tool carrier 12 is guided for displacement along a radial infeed direction X. The tool carrier 12 carries an axial slide 13, which is guided for displacement along a feed direction Z relative to the tool carrier 12. A grinding head 14 is mounted on the axial slide 13, which can be swiveled about a swivel axis running parallel to the X-axis (the so-called A-axis) to adapt to the helix angle of the gear to be machined. The grinding head 14 in turn carries a shift slide on which a tool spindle 15 can be moved along a shift axis Y relative to the grinding head 14. A worm-shaped grinding wheel (grinding worm) 16 is mounted on the tool spindle 15. The grinding worm 16 is driven by the tool spindle 15 to rotate about a tool axis B.

The machine bed 11 also carries a swiveling workpiece carrier 20 in the form of a turret which can be swiveled around an axis C3 between at least three positions. Two identical workpiece spindles are mounted diametrically opposite each other on the workpiece carrier 20, of which in FIG. 1 only one workpiece spindle 21 with associated tailstock 22 is visible. The workpiece spindle visible in FIG. 1 is in a machining position in which a workpiece 23 clamped on it can be machined with the grinding worm 16. The other workpiece spindle, offset by 180° and not visible in FIG. 1, is in a workpiece changing position in which a finished workpiece can be removed from this spindle and a new blank can be clamped. A dressing device 30 is mounted offset by 90° to the workpiece spindles.

All driven axes of the generating grinding machine 1 are digitally controlled by a machine control 40. The machine control 40 comprises several axis modules 41, a control computer 42 and a control panel 43. The control computer 42 receives operator commands from the control panel 43 and sensor signals from various sensors of the generating grinding machine 1 and calculates control commands for the axis modules 41. It also outputs operating parameters to the control panel 43 for display. The axis modules 41 provide control signals at their outputs for one machine axis each (i.e. for at least one actuator which serves to drive the relevant machine axis, such as a servomotor).

A process monitoring device 44 is connected to the control computer 42. This device continuously receives a plurality of measurement values from the control computer 42 and, if necessary, from other sensors. On the one hand, the process monitoring device 44 continuously analyzes the measurement values in order to detect machining errors at an early stage and to remove affected workpieces from the machining process. On the other hand, the process monitoring device 44 uses the measurement values to calculate various characteristic parameters of the last workpiece machined. These processes are described in more detail below.

The process monitoring device 44 transmits a data set for each workpiece to a database server 46. The data set contains a unique workpiece identifier as well as selected process parameters and characteristic parameters. The database server 46 stores these data sets in a database so that the corresponding data set can be called up subsequently for each workpiece. The database server 46 with the database can be located inside the machine or remote from the machine. The database server 46 can be connected to the process monitoring device 44 via a network, as indicated by a cloud in FIG. 1. In particular, the database server 46 can be connected to the process monitoring device 44 via a machine or in-house LAN, via a WAN or via the Internet.

A client 48 can be connected to the database server 46 to retrieve, receive and evaluate data from the database server 46. This connection can also be made via a network, especially via a LAN, a WAN or the Internet. In particular, the client 48 can include a web browser with which the received data and their evaluation can be visualized. The client does not need to meet any special requirements in terms of computing power, nor does the client application require high network bandwidth.

Figures 2, 3, 4:
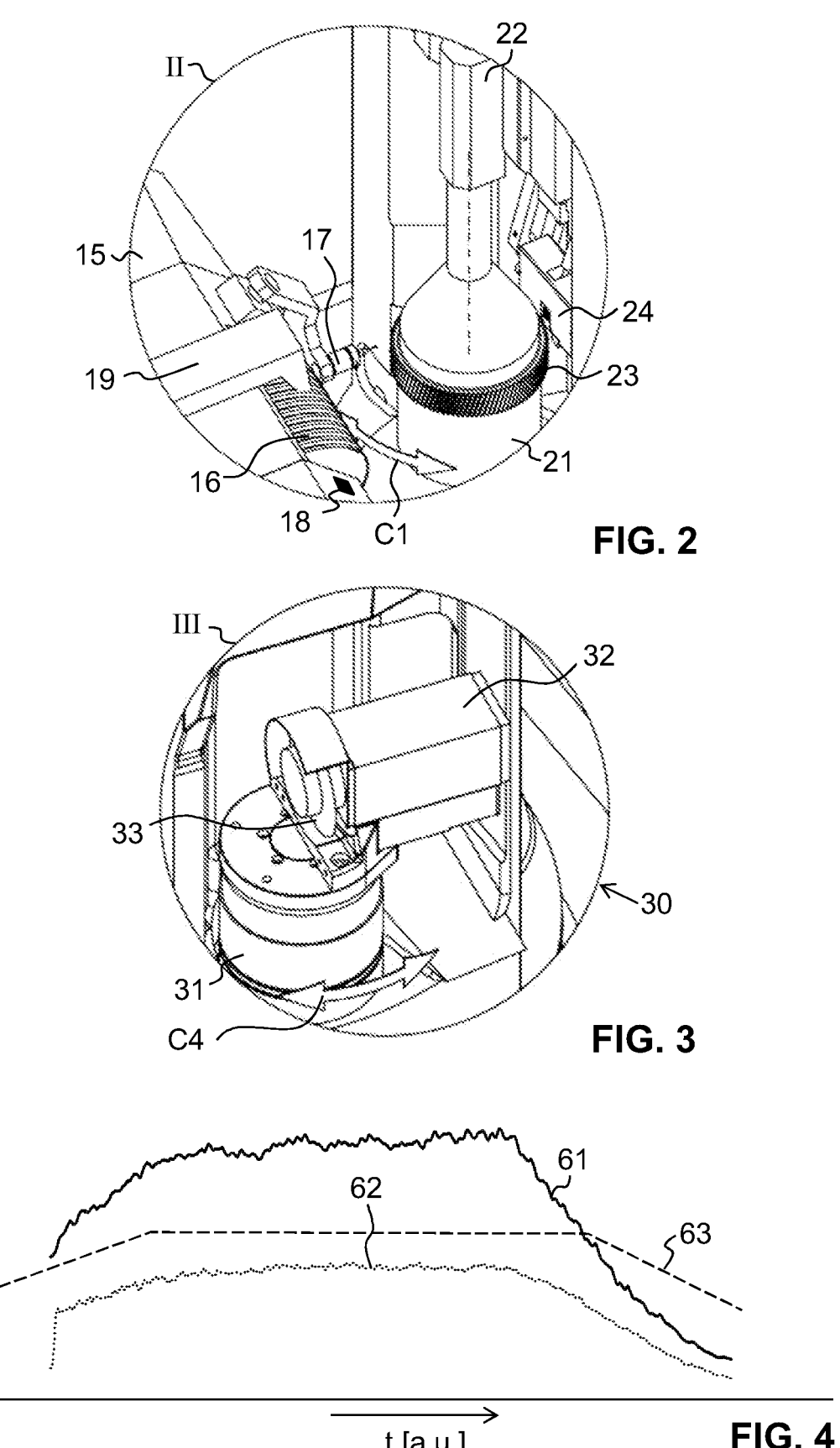
FIG. 2 an enlarged section of FIG. 1 in area II.
FIG. 3 an enlarged section of FIG. 1 in area III.
FIG. 4 a diagram with two exemplary traces of the current consumption of the tool spindle during the machining of a tooth flank.

In FIG. 2, section II of FIG. 1 is shown on an enlarged scale. One can see the tool spindle 15 with the grinding worm 16 clamped on it. A measuring probe 17 is swivel mounted on a fixed part of the tool spindle 15. This measuring probe 17 can be swiveled between the measuring position of FIG. 2 and a parking position. In the measuring position, the measuring probe 17 can be used to measure the gear of a workpiece 23 on the workpiece spindle 21 by touch. This is done "inline", i.e. while workpiece 23 is still on workpiece spindle 21. This allows machining errors to be detected at an early stage. In the parking position, measuring probe 17 is located in an area where it is protected against collisions with workpiece spindle 21, tailstock 22, workpiece 23 and other components on workpiece carrier 20. During workpiece machining, probe 17 is in this parking position.

A centering probe 24 is arranged on a side of the workpiece 23 that faces away from the grinding worm 16. The centering probe 24 is designed and arranged in this example in accordance with publication WO 2017/194251 A1. With regard to the mode of operation and arrangement of a centering probe, explicit reference is made to the above-mentioned publication. In particular, the centering probe 24 can include an inductive or capacitive proximity sensor, as is well known from the state of the art. However, it is also conceivable to use an optically operating sensor for the centering operation, which, for example, directs a light beam onto the gear to be measured and detects the light reflected from it, or which detects the interruption of a light beam by the gear to be measured while it is rotating around the workpiece axis C1. Furthermore, it is conceivable that one or more further sensors are arranged on the centering probe 24, which can record process data directly on the workpiece, as suggested in U.S. Pat. No. 6,577,917 B1, for example. Such additional sensors could include, for example, a second centering sensor for a second gear, a temperature sensor, an additional structure-borne noise sensor, a pneumatic sensor, etc.

In addition, FIG. 2 shows a symbolic reference to an acceleration sensor 18. Acceleration sensor 18 is used to characterize the vibrations of the stator of tool spindle 15 that occur during the grinding process of a workpiece and when dressing the grinding worm. In reality, the acceleration sensor is usually not located on a housing part (as indicated in FIG. 2), but rather, for example, directly on the stator of the drive motor of tool spindle 15. Acceleration sensors of this type are well known.

A coolant nozzle 19 directs a coolant jet into the machining zone. An acoustic sensor not shown here may be provided to indicate noises transmitted via this coolant jet.

In FIG. 3, section III of FIG. 1 is shown on an enlarged scale. The dressing device 30 is particularly easy to recognize here. A dressing spindle 32, on which a disc-shaped dressing tool 33 is clamped, is arranged on a swivel drive 31 and can be swiveled about an axis C4. Instead or in addition, a fixed dressing tool can also be provided, in particular a so-called head dresser, which is intended to engage only with the head areas of the worm threads of the grinding worm in order to dress these head areas.

Processing of a Workpiece Batch

In order to machine an unmachined workpiece (blank), the workpiece is clamped by an automatic workpiece changer on the workpiece spindle that is in the workpiece change position. The workpiece is changed in parallel with the machining of another workpiece on the other workpiece spindle which is in the machining position. When the new workpiece to be machined is clamped and the machining of the other workpiece is completed, the workpiece carrier 20 is swiveled by 180° around the C3 axis so that the spindle with the new workpiece to be machined reaches the machining position. Before and/or during the swiveling process, a centering operation is performed with the aid of the corresponding centering probe. For this purpose, the workpiece spindle 21 is rotated and the position of the tooth spaces of the workpiece 23 is measured with the help of the centering probe 24. This is the basis for determining the rolling angle. In addition, with the help of the centering probe, indications of excessive variation in tooth thickness and other pre-machining errors can be deduced even before machining begins.

When the work spindle carrying the workpiece 23 to be machined has reached the machining position, the workpiece 23 is engaged without collision with the grinding worm 16 by moving the tool carrier 12 along the X axis. Workpiece 23 is now machined by grinding worm 16 in rolling engagement. During machining, the workpiece is continuously advanced along the Z axis at a constant radial X infeed. In addition, the tool spindle 15 is moved slowly and continuously along the shift axis Y in order to allow unused areas of the grinding worm 16 to be used during machining (so-called shift movement). As soon as machining of workpiece 23 is complete, the workpiece is optionally measured inline with the aid of measuring probe 17.

Simultaneous with the machining of the workpiece, a finished workpiece is removed from the other workpiece spindle and another blank is clamped on this spindle. Each time the workpiece carrier is swiveled about the C3 axis, selected components are monitored before swiveling or within the swivel time, i.e. without affecting the cycle time, and the machining process is not continued before all defined requirements have been met.

If, after machining a certain number of workpieces, the use of grinding worm 16 is so advanced that the grinding worm is too blunt and/or the flank geometry is too imprecise, the grinding worm is dressed. To do this, the workpiece carrier 20 is swiveled by ±90° so that the dressing device 30 reaches a position where it is opposite the grinding worm 16. The grinding worm 16 is now dressed with the dressing tool 33.

Data Acquisition for Process Monitoring

The process monitoring device 44 is used to monitor the finishing process carried out on the generating grinding machine 1 and, if necessary, to automatically detect and remove incorrectly machined workpieces and/or to intervene in the finishing process to correct the same.

For this purpose, the process monitoring device 44 receives a plurality of different measurement data from the control computer 42, including sensor data that was recorded directly by the control computer 42 and data that the control computer 42 reads out from the axis modules 41, e.g. data indicating the current or power consumption in the tool and workpiece spindles. For this purpose, the process monitoring device can be connected to the control computer 42 via a known interface, e.g. via the well-known Profinet standard.

The process monitoring device 44 can also have own analog and/or digital sensor inputs to directly receive sensor data from other sensors as measurement data. The additional sensors are typically sensors that are not directly required for controlling the actual machining process, e.g. acceleration sensors to detect vibrations or temperature sensors.

For the following discussion, it is assumed by way of example that the process monitoring device 44 records at least the following measurement data:

instantaneous angular velocity or rotation speed (rpm) of the tool spindle 15;
instantaneous angular velocity or rotation speed (rpm) of the workpiece spindles 21;
current or power consumption of the tool spindle 15;
linear accelerations of the tool spindle housing 15 along three different spatial directions.

Of course, the process monitoring device 44 can also record a plurality of other measurement data.

The process monitoring device 44 continuously records the measurement data during the machining of the workpieces. In particular, the current or power consumption of the tool spindle 15 is recorded at a sufficiently high sampling rate that at least one value for the power consumption during the machining of each tooth flank is present, preferably a plurality of values per tooth flank.

Normalization Operation

In the process monitoring device 44, filtering, e.g. low-pass or band-pass filtering, is first applied to the recorded values of the current or power consumption of the tool spindle in order to reduce high-frequency noise, if necessary. Then, a normalization (standardization) operation is applied to the (possibly filtered) values. The result of the normalization operation is a normalized power indicator. The value of the normalized power indicator is calculated from the determined current or power consumption by multiplication with a normalization factor $N_p$. The normalization factor takes into account geometrical parameters of the finishing tool, geometrical parameters of the workpiece and setting data of the finishing machine such as speed of the tool spindle, radial infeed and axial feed per revolution of the workpiece as well as the resulting contact conditions between tool and workpiece.

This is based on the following considerations. The current or power consumption of the work spindle depends to a large extent on the geometric parameters of the finishing tool, geometric parameters of the workpiece and setting data of the finishing machine. For example, a grinding worm with a larger diameter requires a higher torque for otherwise identical machining conditions due to the longer effective lever arm, and therefore a higher current consumption is expected than for a grinding worm with a smaller diameter. Also, for example, with a higher axial feed rate or a larger radial infeed at otherwise identical conditions, a correspondingly higher current consumption of the tool spindle is also expected, as is a higher speed of the tool spindle. The normalization factor takes such influences into account. As a result, the normalized power indicator will generally not depend on such influences any more or to a much lesser extent than is the case with directly measured current or power consumption. As these influences are already taken into account in the calculation of the normalized power indicator, deviations from a target process can be detected much more easily using the normalized power indicator than would be the case with directly measured current or power consumption.

This is explained in more detail in FIG. 4. FIG. 4 shows two typical curves 61, 62 of the current consumption of the tool spindle during the generating grinding processing of a single tooth flank. The curve 61 was measured for a relatively large radial infeed, the curve 62 for a much smaller radial infeed, with otherwise identical machining conditions. Both curves have a similar shape: after a running-in phase, the current takes on an almost constant value before it drops again in a running-down phase. However, they differ greatly in their current amplitude.

Within the scope of the process monitoring, the temporal course of the current consumption is continuously analyzed in order to detect impermissible process deviations. This can be done in various ways. One possibility, for example, is to define envelope curves that the current consumption must not exceed or fall below. If such an envelope is exceeded or fallen below, an impermissible process deviation can be concluded accordingly. Such an envelope curve 63 is shown in a highly simplified form in FIG. 4 as an example. During machining with the radial infeed for which current curve 62 was recorded, envelope curve 63 represents an upper limit of the current which must not be exceeded. However, this envelope curve is no longer useful if a larger radial infeed is set, as is clearly illustrated by current curve 61: With a larger radial infeed, the current consumption would exceed the envelope curve 63 even if the machining process were correct. Accordingly, the envelope curve 63 would have to be redetermined for each change in radial infeed. This would have to be done on the basis of test machining or empirical values. Both are time-consuming and prone to errors.

For this reason, the measurement values of the current or power consumption are subjected to a normalization operation in the course of the present process monitoring. The normalization operation takes into account, among other things, the radial infeed. This makes the normalized measurement values directly comparable with each other, independent of the value of the radial infeed. Accordingly, the same envelope curve can always be used for different values of the radial infeed. This curve only needs to be determined once and can then be used for a large number of different machining situations.

Similar considerations also apply to other methods for analyzing the measurement values, e.g., when certain spectral components of the measurement values are continuously monitored in frequency space.

Figure 5:
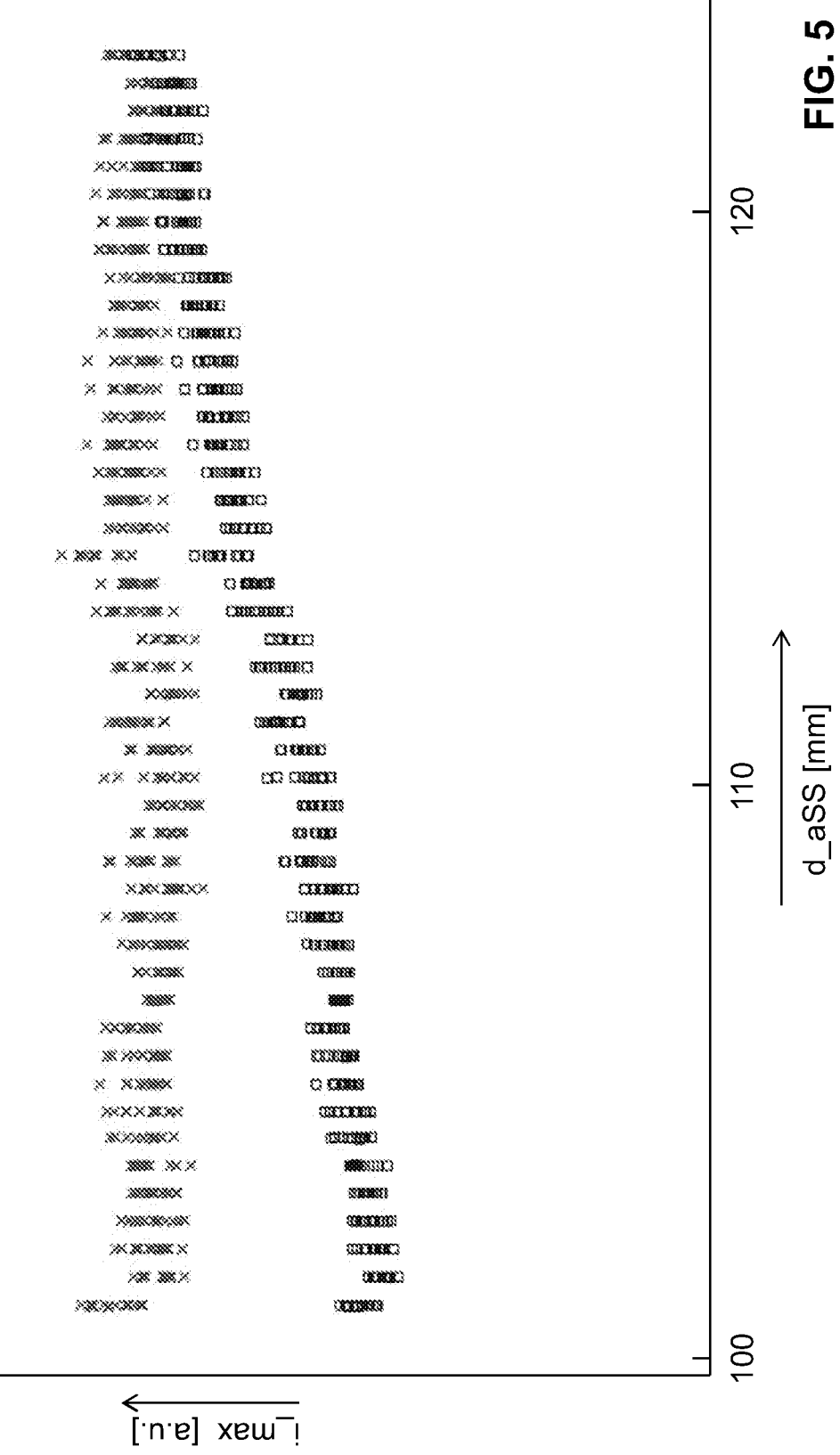
FIG. 5 a diagram showing the maximum value of the current consumption of the tool spindle for a large number of workpieces as a function of the grinding worm outside diameter; squares: unnormalized values; crosses: normalized values.

The influence of the outside diameter of the grinding worm on the measurement values recorded is of particular importance, since the outside diameter of the grinding worm changes with each dressing process. This is illustrated in FIG. 5. FIG. 5 shows the maximum current consumption i_max of the tool spindle, measured during each generating grinding processing on a workpiece, for a plurality of workpieces. The workpieces were all machined with the same grinding worm, with the grinding worm being dressed after a certain number of workpieces had been machined. The outside diameter of the grinding worm is reduced during each dressing operation. As a result, the workpieces were machined with a variable outside diameter. FIG. 5 shows the outside diameter of the grinding worm along the horizontal axis and the maximum current consumption along the vertical axis for those workpieces which were machined with this outside diameter. The maximum current consumption which was measured directly is marked with squares. It is easy to see that this current consumption also decreases with decreasing outside diameter. This means that measurement values of the maximum current consumption with different outside diameters are not directly comparable. In contrast, the normalized maximum current consumption, which results from applying the normalization operation to the measured maximum current consumption, is marked with crosses. The normalization operation takes into account the variable outside diameter of the grinding worm. As a result, the values of the normalized maximum current consumption no longer depend on the outside diameter of the grinding worm.

The normalization operation is preferably performed in real time while the workpiece is being machined on the finishing machine 1. On the one hand, this allows normalized measurement values to be analyzed in real time during workpiece machining, and impermissible process deviations can be detected before the end of machining or immediately afterwards. Affected workpieces can accordingly be identified and rejected immediately in real time. On the other hand, it is ensured that directly after the end of the machining of a workpiece, characteristic parameters of the machining process for the respective workpiece can be calculated from the normalized measurement values. In this way, the calculated characteristic parameters are available immediately after the machining of a workpiece has been completed. On the one hand, an analysis of the calculated characteristic parameters allows further process deviations to be detected at an early stage. On the other hand, there is no need to store the directly recorded measurement values (i.e. the raw data) over a longer period of time, as would be the case with offline evaluation. Instead, it is sufficient to store the calculated characteristic parameters together with an identifier of the respective workpiece and selected process parameters. This allows the memory requirements to be kept very low.

Examples for the Calculation of Characteristic Parameters from Measured Variables In the process monitoring device 44 various characteristic parameters are calculated from the (preferably normalized) power indicator and other measured variables, which characterize the machined workpiece and its machining process. These characteristic parameters are advantageously process-specific characteristic parameters, so that they allow direct conclusions to be drawn about process deviations in the machining process. In particular, the characteristic parameters make it possible to predict certain machining errors of the workpiece. Thus, the number of workpieces that are subjected to individual gear measurements can be reduced, while process deviations can still be reliably detected at an early stage and corrective action can be taken in the machining process if necessary.

The calculation of characteristic parameters from measured variables is illustrated below as an example for the following three characteristic parameters:

(a) cumulative pitch indicator $I_{fP}$ (b) wear indicator $I_{Wear}$ (c) profile shape indicator $I_{ffa}$ All three parameters are determined by a spectral analysis of the temporal course of measured variables over the processing of the workpiece.

(a) Cumulative Pitch Indicator $I_{fP}$

To determine the cumulative pitch indicator $I_{fP}$, the spectral component of the (preferably normalized) power indicator at the workpiece speed $n_C$ is evaluated.

Figure 6:
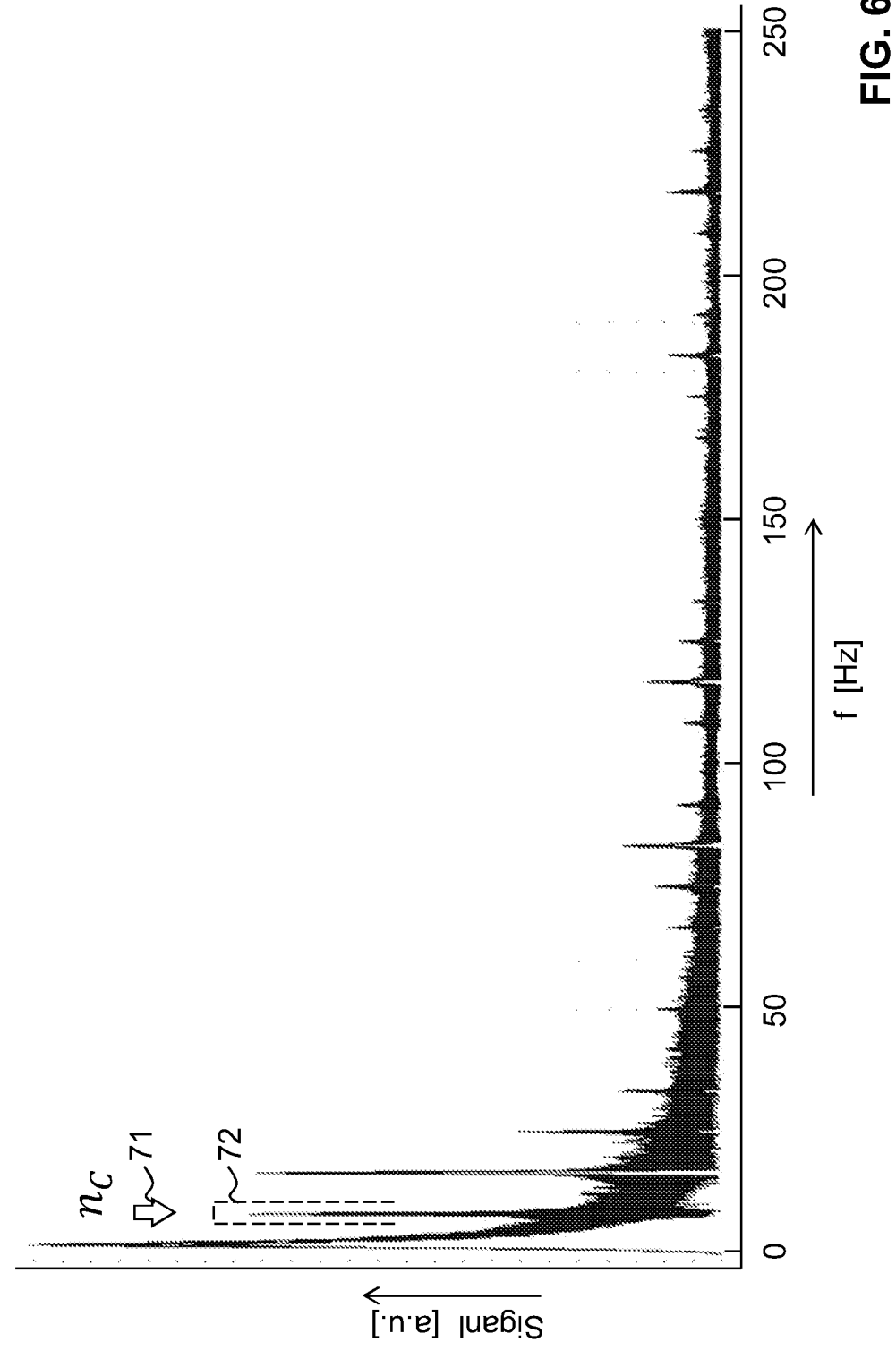
FIG. 6 a spectrum of the current consumption of the tool spindle during the machining of a workpiece.

This is illustrated in FIG. 6. This shows a spectrum of the normalized current consumption (absolute value of the spectral component of the normalized current consumption as a function of the frequency "f"). Such a spectrum can be obtained by an FFT of the time course of the normalized current consumption. An arrow indicates the spectral component of the normalized current consumption at the rotation rate $n_C$ of the workpiece spindle. To quantify this spectral component, the spectral intensity at this frequency can be determined, or a narrow range of the spectrum around this frequency can be integrated. The resulting quantity is the cumulative pitch indicator $I_{fP}$.

The cumulative pitch indicator $I_{fP}$ is generally greater, the greater the cumulative circular pitch error of the pre-toothing of the workpiece, and/or the worse the concentricity of the workpiece. From the accumulated pitch indicator $I_{fP}$ it is therefore possible to deduce existing accumulated pitch errors of the raw parts from pre-processing and/or concentricity errors, e.g. due to incorrect alignment of the clamping device for the workpieces.

(b) Wear Indicator $I_{Wear}$

To determine the wear indicator $I_{Wear}$, the static part of the normalized power indicator, i.e. the part below an upper cut-off frequency of e.g. 2 Hz, is determined. For this purpose, e.g. the time course of the power indicator can be low-pass filtered and integrated.

The wear indicator $I_{Wear}$ can be understood as a measure of the normalized cutting energy applied to a workpiece after all geometrical influences and the influences of the technology data used, such as radial infeed and axial feed, have been eliminated by the normalization operation. In simple terms, the higher the value of the wear indicator $I_{Wear}$, the more material the grinding worm has removed from the workpiece at a given drive power. Thus, a reduction in the wear indicator reflects a deterioration in the removal behavior of the tool on the workpiece under otherwise unchanged conditions. To this extent, a decrease in the value of the wear indicator $I_{Wear}$ is indicative of an increasing wear and tear of the tool.

(c) Profile Shape Indicator $I_{ffa}$

The normalized current consumption becomes less and less meaningful towards higher frequencies. For this reason, other measurement values are preferably used for the calculation of parameters resulting from higher-frequency process components, e.g. the measurement values of acceleration sensors 18.

To determine the profile shape indicator $I_{ffa}$, the spectral component of such measurement values is evaluated at the tooth mesh frequency. The tooth mesh frequency corresponds to the workpiece speed multiplied by the number z of teeth on the workpiece:

$$f_z = n_C \cdot z$$

Figure 7:
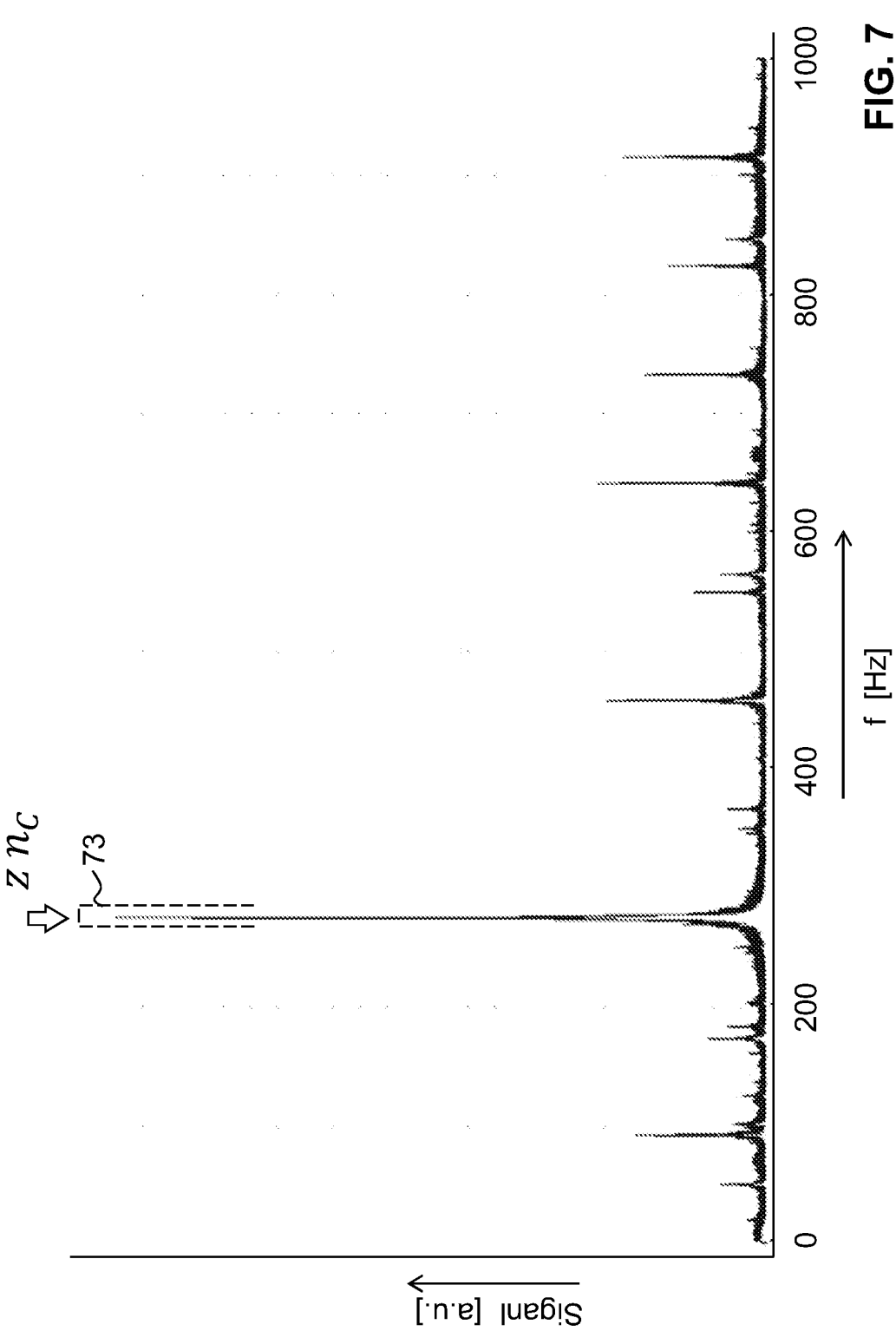
FIG. 7 a spectrum of measurement values from an acceleration sensor during the machining of a workpiece.

This is illustrated in FIG. 7, which shows a spectrum of the signals from acceleration sensor 18 during the machining of a workpiece. The spectral component at the tooth mesh frequency is marked with an arrow. This can be quantified, for example, by integrating a narrow range of the spectrum around the tooth mesh frequency.

The profile shape indicator $I_{ffa}$ is generally greater, the more the profile shape deviates from the ideal profile shape according to its specification. The profile shape indicator can therefore be used to draw conclusions about profile shape deviations or process deviations that lead to such profile shape deviations.

Example for the Calculation of Other Characteristic Parameters

The calculation of characteristic parameters was explained above using three examples. It goes without saying, however, that a large number of other characteristic parameters can be determined.

Another example is the vibration indicator $I_{Vib}$. This characteristic parameter is obtained by integrating the absolute values of the acceleration sensor measurement signals in the frequency domain.

Detection of Process Deviations

By monitoring changes in the determined characteristic parameters over a number of workpieces, indicators for deviations of the machining process from an idealized target process can be determined. On this basis, the machining process can be adjusted accordingly to reduce the deviations. A comparison of the determined characteristic parameters for a number of workpieces can also be used to define limit values such as the above-mentioned envelopes for real-time monitoring more precisely, in order to detect impermissible process deviations in real time with greater accuracy.

This will be explained in the following using FIGS. 8 to 11.

When interpreting these diagrams, certain peculiarities of the processing method selected here must be taken into account in advance.

First, it should be noted that each workpiece is machined in two passes, one roughing and one finishing. The shift strategy is adapted to this as follows: Each workpiece is first rough-machined with a specific grinding worm region. Then the grinding worm is shifted by a certain amount (towards higher Y values in the diagrams, i.e. to the left) so that an unused grinding worm region is used for finishing. After finishing, the grinding worm is shifted back to the end of the grinding worm region that was last used for roughing, and the following grinding worm region is used for roughing the next workpiece. As a result, almost every grinding worm region is used first for finishing one workpiece and then for roughing a subsequent workpiece. Only the rightmost grinding worm region, near Y=0, is used for roughing operations only in this shift strategy. The machining position Y in FIGS. 8 to 11 shows which worm region along the grinding worm width was used to machine the respective workpiece during roughing.

On the other hand, it should be noted that the grinding worm is freshly dressed each time the end of the grinding worm is reached during shifting. The outside diameter of the grinding worm is reduced during dressing. On the one hand, this changes the leverage ratios by which a drive torque is converted into a cutting force when grinding the workpieces, and on the other hand, the contact conditions during the machining of each tooth flank also change. FIGS. 8 to 11 each show a parameter over several dressing cycles as a function of the machining position Y during roughing. Thanks to the normalization operation, dressing has little or no influence on the respective parameter. The reason for this is that the influence of the dressing operation on the geometry of the grinding worm is taken into account by the normalization factor. As a result, values of the normalized power indicator in different dressing cycles are directly comparable with each other. Correspondingly, the characteristic parameters shown for different dressing cycles are also directly comparable with each other despite the varying outside diameter of the grinding worm. This is a great advantage of the proposed normalization operation.

Figure 8:
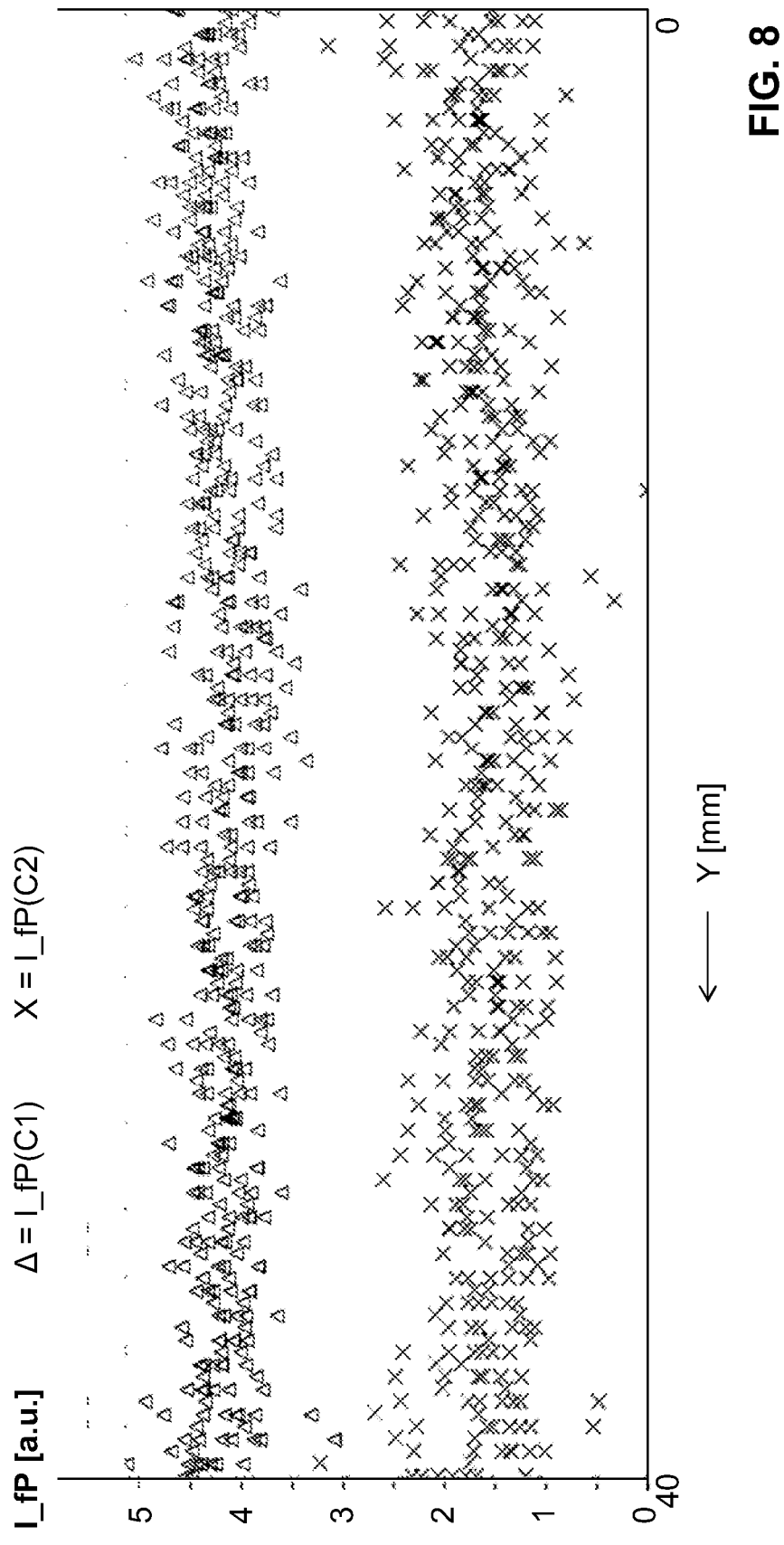
FIG. 8 a diagram showing values of an cumulative pitch indicator for a plurality of workpieces as a function of the grinding worm position.

In FIG. 8, the cumulative pitch indicator $I_{fp}$ for the roughing process for a plurality of workpieces over several dressing cycles as a function of the machining position Y along the grinding worm width is depicted. The diagram distinguishes whether the workpiece was machined on the first or the second workpiece spindle ($I_{fp}(C1)$ or $I_{fp}(C2)$). With triangles, the cumulative pitch indicator $I_{fp}(C1)$ for workpieces machined on the first workpiece spindle is indicated, while crosses indicate the cumulative pitch indicator $I_{fp}(C2)$ for workpieces that were machined on the second workpiece spindle.

It is immediately apparent that the cumulative pitch indicator for the first workpiece spindle is considerably higher on average than for the second workpiece spindle. For workpieces that are pre-machined in the same way, this indicates concentricity errors of the workpieces on the first workpiece spindle due to incorrect alignment of the clamping device. Such concentricity errors can lead to unwanted noise when using the gear produced in this way. At the same time, it can be seen that the dressing operations have practically no influence on the value of the determined cumulative pitch indicator thanks to the normalization operation.

The recognition of concentricity errors and the corresponding cause is thus made easier for the operator by the fact that the characteristic parameter $I_{fp}$ is correlated with another quantity of the machining process, in this case with the position Y along the width of the grinding worm, and displayed visually. Instead of the position Y, a correlation could also be made here with other quantities, in the simplest case with a consecutive workpiece number.

Figure 9:
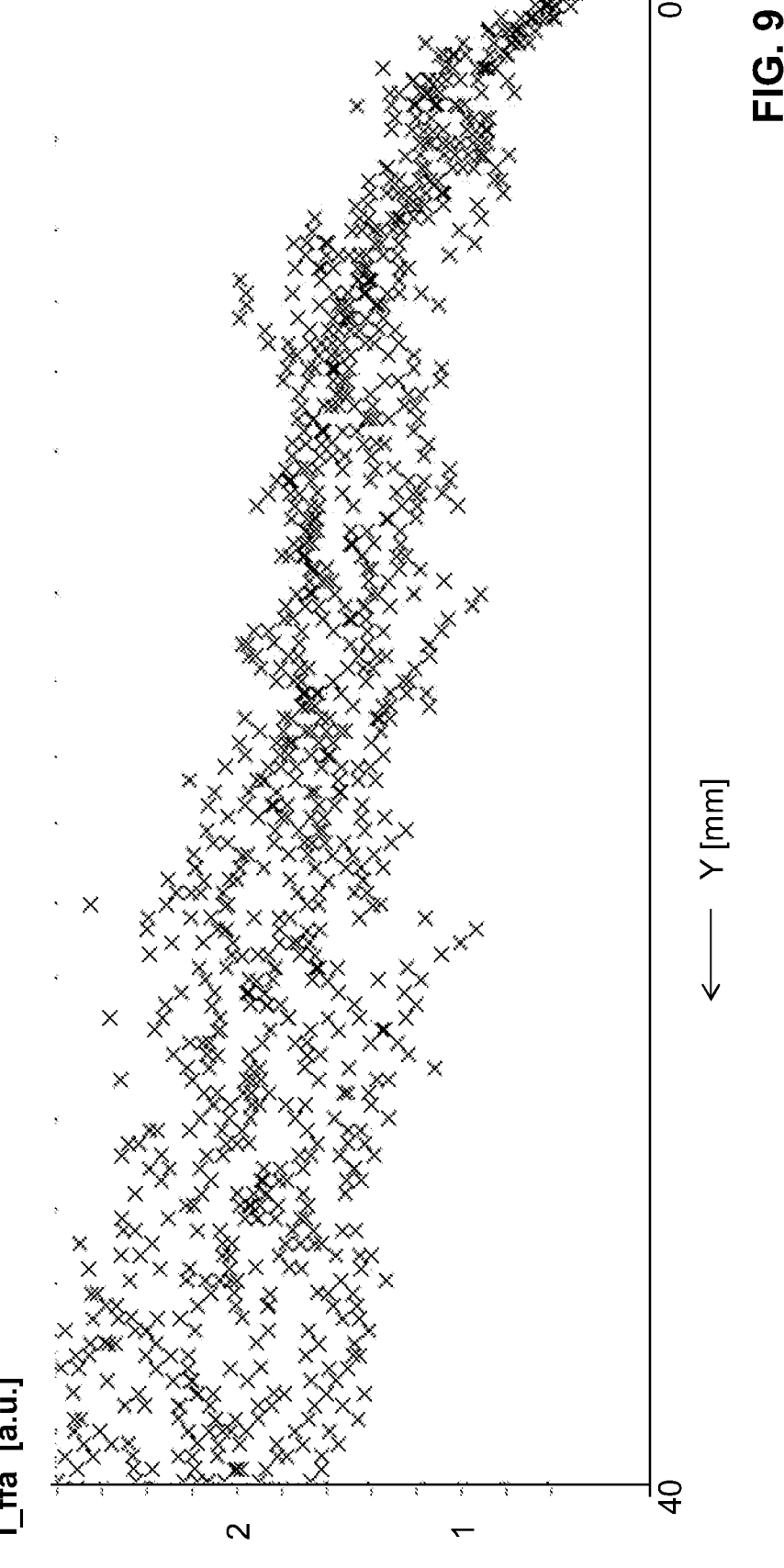
FIG. 9 a diagram showing values of a profile shape indicator for a plurality of workpieces as a function of the grinding worm position; triangles: first workpiece spindle; crosses: second workpiece spindle.

In FIG. 9, the profile shape indicator $I_{ffa}$ for a plurality of workpieces is again represented as a function of the machining position Y for the roughing operation over several dressing cycles. It can be seen that regardless of the dressing cycle, the profile shape indicator is considerably smaller at the right end of the grinding worm (near Y=0), where machining begins after each dressing operation, than in the further progression of the machining position along the grinding worm and increases on average towards the left end of the grinding worm (Y=40 mm) with a large variation. The diagram thus shows that the first workpieces of a dressing cycle are always produced with the correct profile shape, while profile shape deviations increasingly occur for later workpieces, which in addition vary strongly. In view of the shift strategy shown above, this indicates that the grinding worm is overloaded in the areas where it is used first for a finishing operation and later for a roughing operation.

In FIG. 9, the recognition of profile shape errors and their causes is made easier for the operator by the fact that the parameter $I_{ffa}$ is correlated and visually displayed with another quantity of the machining process, in this case again with the position Y along the grinding worm width.

Figure 10:
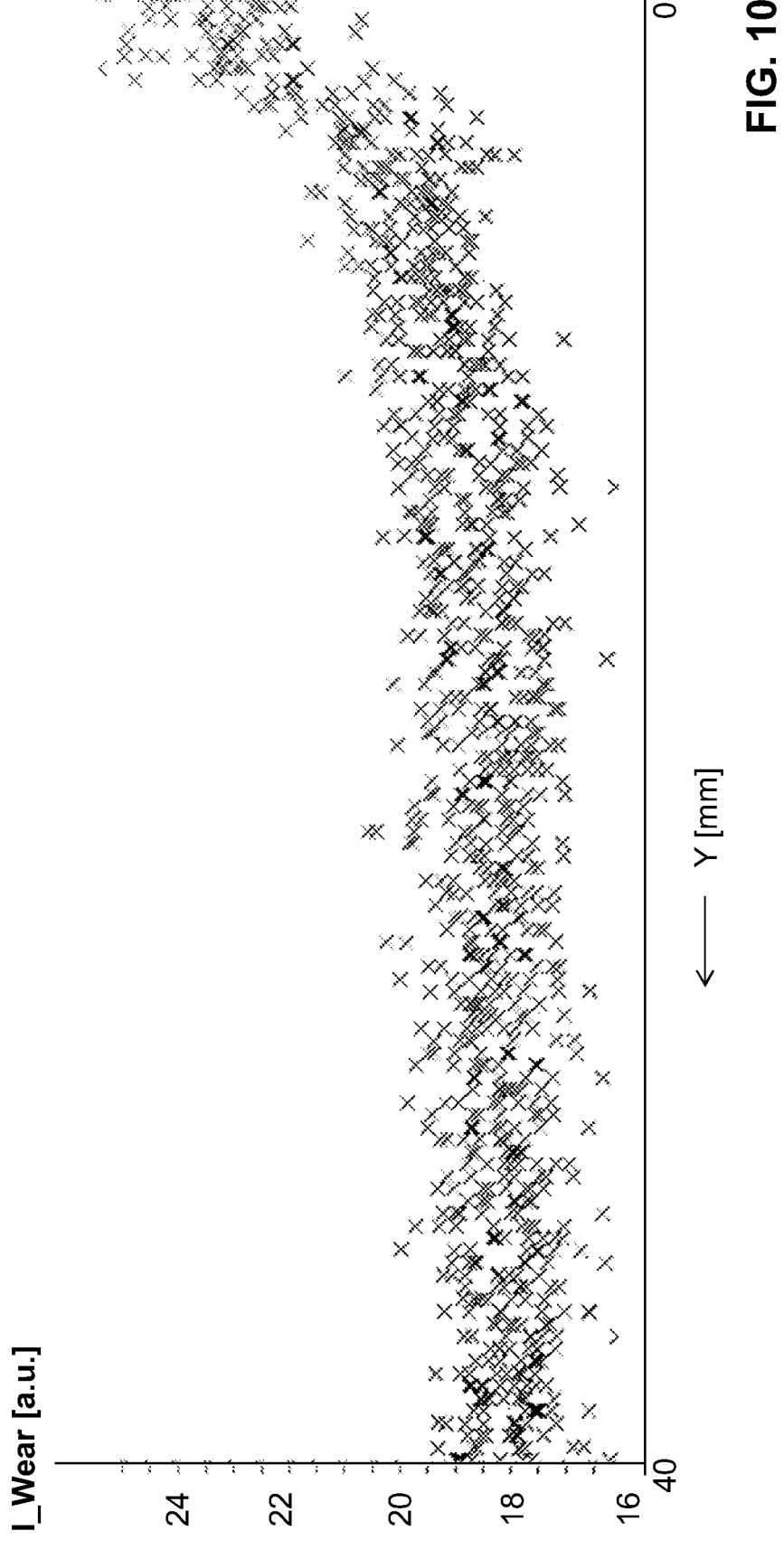
FIG. 10 a diagram showing values of a wear indicator for a plurality of workpieces as a function of the grinding worm position.

In FIG. 10 the wear indicator $I_{Wear}$ for a plurality of workpieces is again represented as a function of the machining position Y for the roughing operation. The wear indicator has relatively large values at the right end of the grinding worm close to Y=0. As the machining position progresses along the grinding worm width, the wear indicator rapidly decreases to significantly lower values. It should be noted that the wear indicator is not a direct measure of the wear itself, but a measure of the amount of material removed on the tooth flank. This means that over the largest range of the grinding worm width, less material is removed from the tooth flanks than in the rightmost range near Y=0. This indicates increased wear in all regions except the rightmost range. The course of the wear indicator over the grinding worm width thus confirms the findings that can also be obtained from the course of the profile shape indicator over the grinding worm width: The wear indicator shows that the grinding worm is excessively worn everywhere except in the rightmost area close to Y=0.

Figure 11:
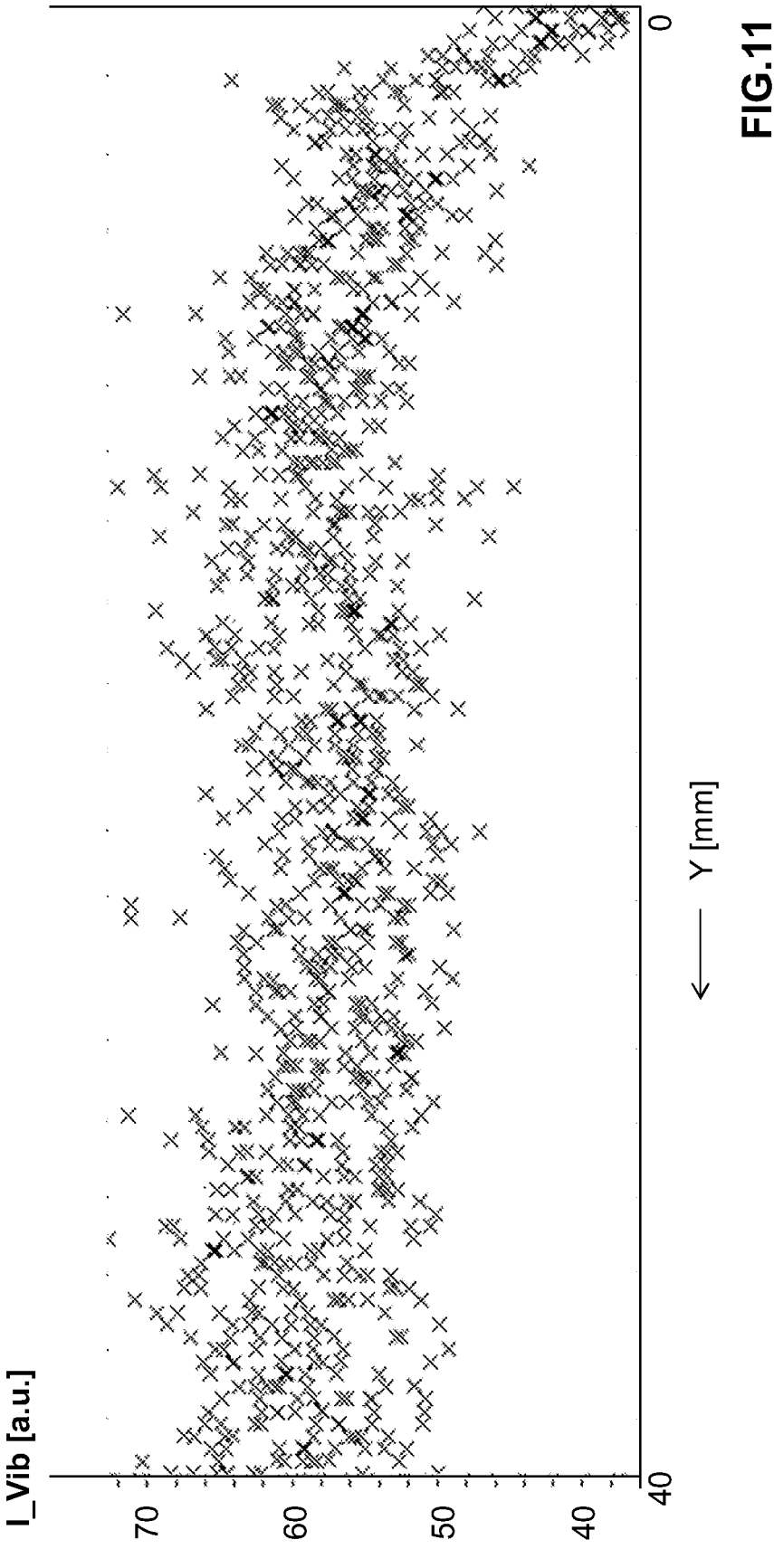
FIG. 11 a diagram showing values of a vibration indicator for a plurality of workpieces as a function of the grinding worm position.

FIG. 11 shows the vibration indicator $I_{Vib}$, for a plurality of workpieces as a function of the machining position Y for the roughing operation. The vibration indicator shows that in the worn area of the grinding worm, despite the lower material removal rate, a higher vibration load is generated. This in turn can lead to unwanted noise when using the gear thus produced. The course of the vibration indicator over the width of the grinding worm thus once again confirms the findings already gained from the course of the profile shape indicator and the wear indicator.

In order to take corrective action here, the speed of the tool spindle, the radial infeed or the axial feed per revolution of the workpiece can be reduced, for example.

Comparison with Measurement Values from Gear Measurement

The determined characteristic parameters can be compared for selected workpieces with the results of a gear measurement on a gear measuring machine. In this way, parameters describing the correlation of the characteristic parameters with actual shape deviations can be quantitatively determined. For example, in the case of a linear correlation between characteristic parameter and shape deviation, a linear regression can be performed to determine the coefficients of the linear correlation. This makes it possible to quantify shape deviations directly for each machined workpiece with the aid of the characteristic parameters, which would otherwise only be possible by means of gear measurements and would involve a disproportionate amount of effort.

Web-Based Interface

The graphical representation of the determined characteristic parameters and their correlation with other characteristic values of the machining process can be carried out on any client computer via a web browser, in particular, in a platform-independent way. Other evaluation measures can also be realized accordingly in a platform-independent way. This facilitates remote analysis.

Automatic Detection of Machining Errors

In the above example, the analysis of the course of the various characteristic parameters over the grinding worm width was carried out visually by the operator at the machine or by an expert at an arbitrary client computer. Instead, such an analysis can also be carried out fully automatically.

For this purpose, the process monitoring device 44 can execute an algorithm that automatically recognizes patterns in the determined characteristic parameters across several workpieces. Machine learning algorithms are particularly suitable for this purpose, as they are known in various versions. Such algorithms are often also referred to as "artificial intelligence". An example of this are neural network algorithms. It is obvious that such an algorithm in the above examples could easily detect, for example, differences in the cumulative pitch indicator between the first and second work spindle or the wear behavior over the grinding worm width described above. For this purpose, the algorithm can be trained in the usual way using training data sets. The training data sets can in particular take into account parameters that describe the correlation of the characteristic parameters with actual shape deviations according to gear measurement.

The necessary measures can now be taken to eliminate process deviations. For example, when concentricity errors are detected, the centering of the workpiece clamping device on the corresponding workpiece spindle can be corrected manually or automatically. If excessive wear is detected, the radial infeed and/or the axial feed can be reduced accordingly. These measures can also be taken manually or automatically.

Force Model

The calculation of the normalization factor is preferably model-based.

For generating grinding, models exist in the literature which describe the dependence of the cutting force on geometric parameters of the tool and workpiece and on technological parameters. As an example, reference is made to the already mentioned book by H. Schriefer et al., "Continuous Generating Gear Grinding", edited by Reishauer AG, Wallisellen 2010, ISBN 978-3-033-02535-6, in Chapter 4.7.3 "Cutting Force", pages 319 to 322.

In the following, reference is made to the force model used in the thesis of C. Dietz, "Numerische Simulation des kontinuierlichen Wälzschleifprozesses unter Berücksichtigung des dynamischen Verhaltens des Systems Maschine—Werkzeug—Werkstück" ("Numeric Simulation of Continuous Generating Grinding taking into Account the Dynamic Response of the System Machine—Tool—Workpiece"), Diss. ETH Zurich No. 24172, https://doi.org/10.3929/ethz-b-000171605. In this document, methods are disclosed for numerically modeling the continuous generating grinding process. In particular, a model for the calculation of the cutting force is presented, and procedures are shown how the parameters of this model can be determined experimentally by measurements.

The force model for the normal force is given in Eq. 4.27 of the dissertation of C. Dietz as follows:

$$F_n = F_0 + k\left(\frac{a_e v_f}{v_c}\right)^{\epsilon_1} l_k^2 a_p$$

Here, $a_e$ designates the depth of cut, $a_p$ the cutting width, $l_k$ is the contact length of the cutting zone, $v_c$ the cutting speed and of the feed rate. The constants $F_0$ and k and the exponents $\epsilon_1$ and $\epsilon_2$ are quantities to be determined empirically.

The cutting force $F_c$ is proportional to the normal force $F_n$, where the constant of proportionality $\mu$ is called the force ratio:

$$F_c = \mu F_n$$

The force ratio µ is again a quantity to be determined empirically.

The geometrical variables $a_e$, $a_p$ and $l_k$ describe the cutting zone. They can be calculated analytically, as indicated in chapter 4.5.1 of the dissertation by C. Dietz, or determined numerically by a penetration computation.

In particular, the following analytical relationship for the contact length $l_k$ can be derived:

$$l_k = \sqrt{r_{pSS,eq}^2 - (r_{pSS,eq} - q_t)^2} + s_z/2$$

Here, $r_{pSS,eq}$ designates the equivalent grinding worm radius, $q_t$ the nominal grinding allowance, and $s_z$ the radial feed per revolution of the workpiece. The equivalent grinding worm radius $r_{pSS,eq}$ can be calculated from the real grinding worm radius $r_{pSS}$ as follows:

$$r_{pSS,eq} = r_{pSS} \Big/ \left( \frac{\sin(\alpha_{SS})}{2} \right)$$

Here $\alpha_{SS}$ designates the pressure angle of the grinding worm gear.

For the cutting width $a_p$, the following analytical relationship can be derived:

$$a_p = \sqrt{a_{p,max}^2 - \frac{a_{p,max}^2 (l_k - 1.5 \cdot s_z)^2}{(l_k - s_z)^2}}$$

Here $a_{p,max}$ designates the maximum cutting width. This is calculated as follows:

$$a_{p,max} = \sqrt{L_y^2 - (L_y - q_t)^2}$$

Here $L_y$ designates the rolling length.

The depth of cut corresponds to the nominal grinding allowance, which in turn relates to the radial infeed $\Delta x$ as follows:

$$a_e = q_t = \Delta x \cdot \sin(\alpha_t)$$

Here $\alpha_t$ designates the pressure angle of the workpiece.

The cutting speed $v_c$ and the feed rate $v_f$ result from the kinematics of the generating grinding process. Analytical formulas can also be given for these variables, as is stated in chapter 4.7.1 of the dissertation by C. Dietz. For instance, the following applies to the cutting speed $v_c$:

$$v_c = \sqrt{v_{cu}^2 + v_{ca}^2 + v_{cw}^2}$$

Here $v_{cu}$ designates the peripheral speed, $v_{ca}$ the axial velocity component and $v_{cw}$ the rolling speed.

For the peripheral speed $v_{cu}$, the following holds:

$$v_{cu} = n_B \pi d_{pSS}/60$$

Here $n_B$ designates the rotation speed of the tool (in rpm) and $d_{pSS}$ the diameter of the grinding worm at the momentary contact point along the profile height of the respective worm thread.

For the axial velocity component $v_{ca}$, the following holds:

$$v_{ca} = \frac{m_{nSS} z_0 n_B \pi}{60 \cos \gamma}$$

Here $m_{nSS}$ designates the normal module of the grinding worm, $z_0$ the number of starts and $\gamma$ the helix angle of the worm gear.

For the rolling speed $v_{cw}$, the following holds:

$$v_{cw} = \frac{m_{nSS} z_0 n_B \pi}{60} \sin \alpha_{SSy}$$

Here $\alpha_{SSy}$ designates the local pressure angle of the contact point on the grinding worm.

For the feed rate $v_f$, the following holds:

$$v_f = \frac{z_0 s_z n_B}{60 \cos \beta}$$

Here $\beta$ designates the helix angle of the gear on the workpiece.

Alternatively, the geometric variables $a_e$, $a_p$ and $l_k$ for the description of the cutting zone as well as the cutting speed $v_c$ and the feed rate $v_f$ can also be determined from a numerical process simulation.

The constants $F_0$ and k, the exponents $\in_1$ and $\in_2$ and the force ratio µ can be determined empirically, as given as an example in chapter 5.3 of the dissertation of C. Dietz.

In the dissertation of C. Dietz, the following values were empirically determined for the generating grinding of gears made of hardened steel with vitrified bonded tools using aluminum oxide abrasive:

$F_0$=21.2422 N
k=4.4338
$\in_1$=0.1950
$\in_2$=2.0136
µ=0.3

With these values real measured process forces can be reproduced with very high accuracy by the force model.

For other material pairings, the values of the above mentioned parameters may deviate from the values given above. However, such values can easily be determined empirically by comparing measured and calculated force values.

Modeling of the Process Power

The power $P_B$ to be provided by the tool spindle is obtained as the product of the cutting force $F_c$ and the peripheral speed $v_{cu}$ of the grinding worm at the contact point between grinding worm and workpiece. On the one hand, this peripheral speed is proportional to the rotation speed $n_B$ of the tool spindle, on the other hand it is proportional to the effective lever arm, which is half the diameter $d_{pSS}$ of the grinding worm at the contact point.

The process power can be modeled as a whole as:

$$P_B = F_c \cdot n_B \pi d_{pSS}/60$$

The diameter $d_{pSS}$ of the grinding worm at the contact point can be replaced in a good approximation by its outside diameter $d_{aSS}$.

Calculation of the Normalization Factor

Based on this model of process power, the normalization factor can be selected as follows, for example:

$$N_P = \left(F_0 + k\left(\frac{a_e v_f}{v_c}\right)^{\epsilon_1} f_k^2 a_p\right)^{-E_1} \cdot \left(\frac{d_{aSS}}{d_{aSS,max}}\right)^{-E_2} \left(\frac{n_B}{n_{B,ref}}\right)^{-E_3}$$

Here $d_{aSS,max}$ is the maximum outside diameter after the first dressing operation. Alternatively, any other reference value can be used here. The expression $n_{B,ref}$ designates an arbitrary reference speed.

For the exponents $E_1$, $E_2$ and $E_3$, the following applies in this model:

$$E_1 = E_2 = E_3 = 1$$

In an extension of the model, however, these exponents can also deviate from 1 and be determined empirically.

The first factor (with exponent $E_1$) results directly from the force model. It takes into account the geometry of the grinding worm and the workpiece as well as the technological specifications, especially the radial infeed and the axial feed.

The second factor (with exponent $E_2$) takes into account the lever ratios at the contact point, which change depending on the grinding worm diameter.

The third factor (with exponent $E_3$) takes into account the dependence of the process power on the speed of the tool spindle.

As can be seen from the above discussion of the force model and the further explanations in the dissertation by C. Dietz, the cutting force changes to a certain extent over the machining of a flank. However, for the purpose of process control, the cutting force can be considered constant over the machining of one flank, neglecting the run-in and run-out. Accordingly, it is sufficient to recalculate the normalization factor $N_P$ after each dressing operation (which changes the geometry of the grinding worm) and after each change in technological parameters (in particular radial infeed and/or axial feed). This normalization factor $N_P$ can then be used for all workpieces of a dressing cycle.

The normalization factor $N_P$ can of course also be calculated in a different way than the above mentioned. More complex normalization operations are also conceivable, e.g. operations which first include a subtraction to eliminate an offset, and only then a multiplication or division.

The above considerations apply to generating grinding. For other finishing operations, there are other models of cutting force and accordingly, for other finishing operations, the normalization factor will differ from the normalization factor indicated above.

Flowcharts for Exemplary Methods

Figure 12:
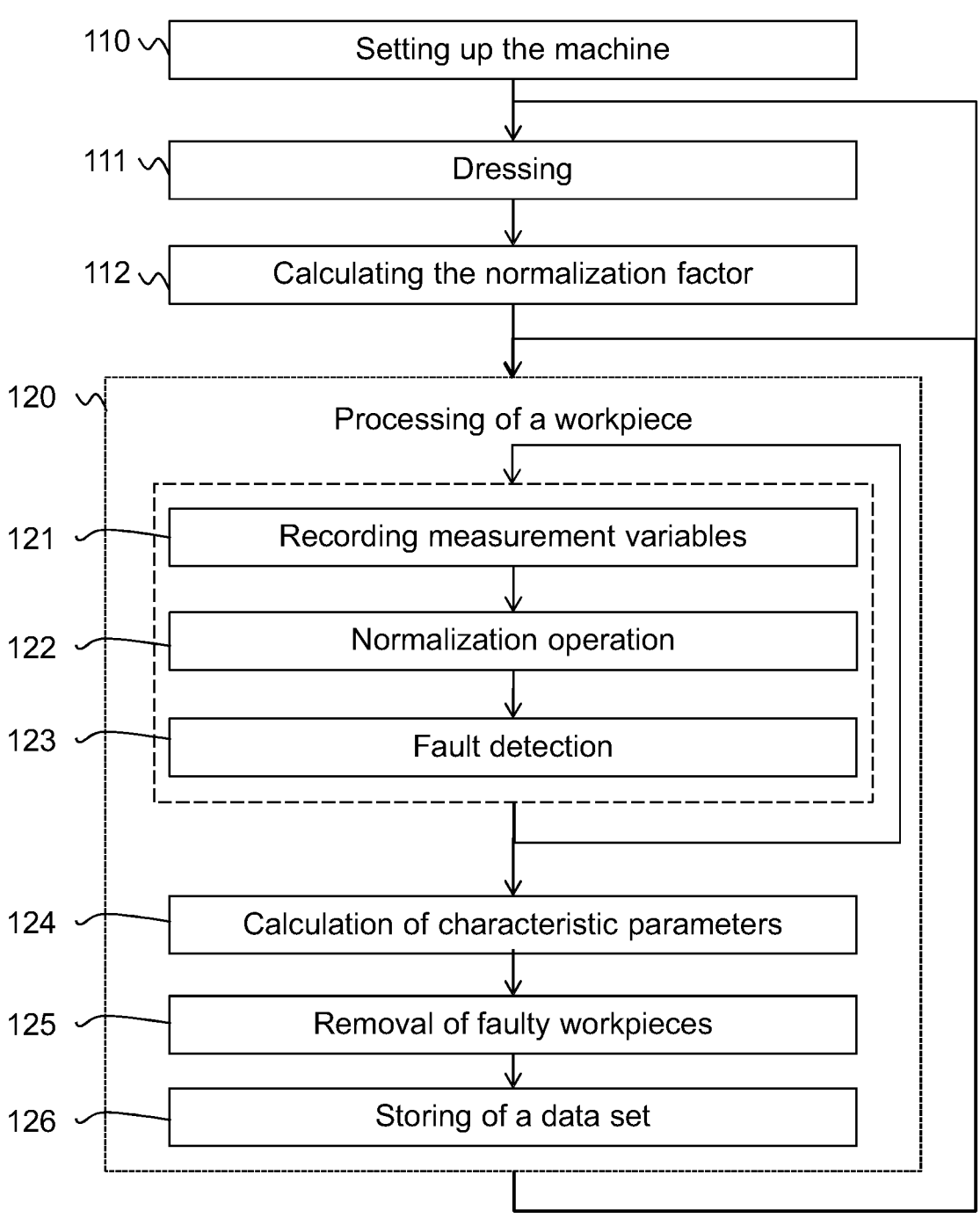
FIG. 12 a flow chart of a process for monitoring the processing of a workpiece batch.

FIG. 12 shows a flow chart of an exemplary method for monitoring a process in the context of generating grinding of a batch of similar workpieces with a finishing machine of the type shown in FIG. 1.

In step 110, the finishing machine is set up and the relevant process parameters (in particular geometric parameters of the grinding worm and workpieces as well as technological parameters such as radial infeed and axial feed) are entered into the machine control 42 via control panel 43. In step 111 the grinding worm 16 is dressed, and the outside diameter of the dressed grinding worm is determined. In step 112, a normalization factor is calculated on the basis of the process parameters and the outside diameter of the grinding worm.

In block 120, the individual workpieces of the batch are machined. During the machining process, measured variables are continuously recorded by the process monitoring device 44 in step 121. In step 122, at least some of the measured variables, in particular measured variables relating to the current consumption of the tool spindle, are normalized in real time. In step 123, the now partially normalized measured variables are continuously analyzed in real time in order to detect possible machining errors directly online, while the individual workpiece is still being machined, based on process deviations. If a possible machining error is detected, a corresponding information variable is set in the process monitoring device. Steps 121 to 123 are continuously repeated during the machining of the workpiece.

Immediately after completion of the machining of the workpiece, characteristic parameters are calculated in step 124 from the partially normalized measured variables. The characteristic parameters are compared with the specifications. If it is found that the parameters deviate excessively from the specifications, an information variable for a machining error is set.

In step 125, a workpiece handling system is instructed by means of the information variables to remove workpieces for which indications of machining errors were detected. These workpieces can be subjected to a more detailed inspection or immediately rejected as NIO parts.

In step 126, a data set for each workpiece is stored in a database. This data set includes a unique workpiece identifier, the most important process parameters, the determined characteristic parameters and optionally the information variables.

The machining of workpieces is now repeated in the same way until the grinding worm is worn down to such an extent that a new dressing operation is necessary. In this case step 111 is repeated, i.e. the grinding worm is dressed again and its new outside diameter is determined. Accordingly, the normalization factor is recalculated in step 112. Machining 120 of the workpieces is now continued with the newly dressed grinding worm and the new normalization factor.

Figure 13:
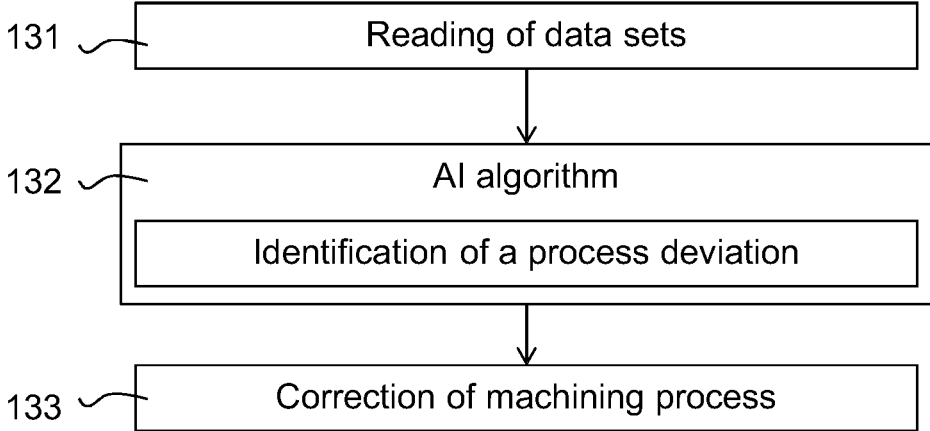
FIG. 13 a flow chart of a process for the automatic detection and correction of process deviations.

FIG. 13 illustrates how further process deviations can be automatically detected from the stored data sets for several workpieces. In step 131, data sets for a number of workpieces are read from the database. In step 132, these data sets are analyzed by an AI algorithm (AI=artificial intelligence) in order to identify process deviations from the data sets which may not have been directly detectable during the machining of the individual workpieces. In step 133, the result of this analysis is used to automatically initiate measures to correct the machining process (e.g. reduction of the axial feed, etc.). These steps can be carried out whenever a certain minimum number of workpieces have been machined. However, the analysis can also be carried out subsequently after the end of the machining of the workpiece batch, for example, to subsequently identify those workpieces that are affected by a machining error.

This process requires only a moderate amount of computation and memory, since the stored data sets are very small compared to the amount of data acquired directly during processing.

Figure 14:
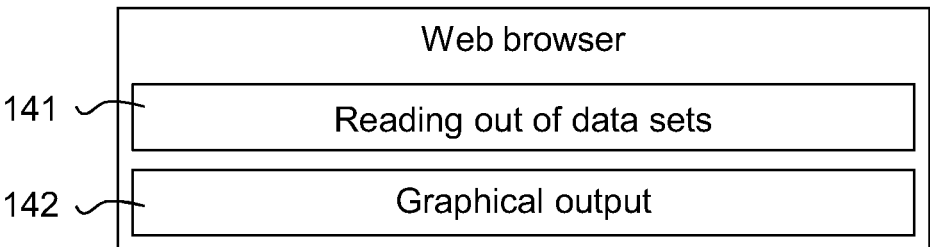
FIG. 14 a flow chart of a method for the graphical output of parameters and information derived therefrom.

As illustrated in FIG. 14, independently of this, the data sets can be read from the database at any time with a client computer via a network (step 141) and graphically edited and output (step 142). This procedure also requires only a very moderate amount of computing and memory. This makes it possible to perform this process using a plugin in a web browser. Based on this output, the operator can perform an error analysis and, for example, redetermine the envelopes described above that are applied during the real-time analysis.

Block Diagram for Functional Blocks of the Process Monitoring Device

Figure 15:
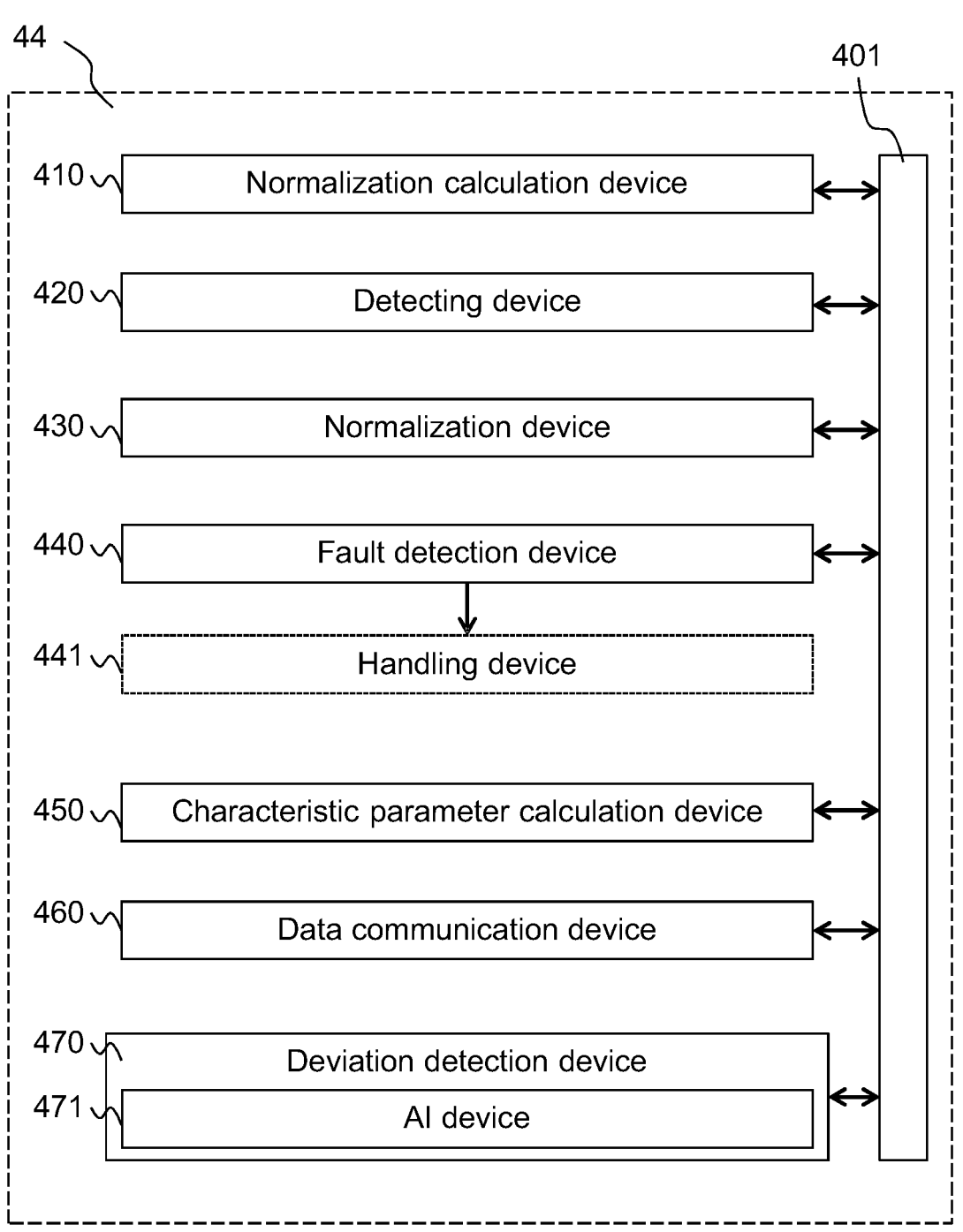
FIG. 15 a schematic block diagram of functional units of a process monitoring device.

FIG. 15 shows an example of a block diagram which schematically shows various function blocks of the process monitoring device 44. The function blocks are functionally connected to each other via a command and data exchange component 401.

A normalization calculation device 410 calculates the normalization factor when required. A detecting device 420 is used to detect measurement values. A normalization device 430 normalizes at least a part of the measurement values immediately after their detection. A fault detection device 440 analyzes the partially normalized measurement values and identifies impermissible process deviations. A handling device 441 (strictly speaking, not part of the process monitoring device) then removes workpieces that have been processed with impermissible process deviations. After the end of the machining of a workpiece, a characteristic parameter calculation device 450 calculates characteristic parameters from the partially normalized measurement values. A data communication device 460 is used for communication with a database server. A deviation detection device 470 is used for the automatic detection of process deviations. For this purpose, the deviation detection device 470 comprises a processor device 471 which executes an AI algorithm.

It goes without saying that a large number of variations of the examples given above are possible.

The invention claimed is:

1. A method for monitoring a machining process in which tooth flanks of pre-toothed workpieces are machined with a finishing machine, the finishing machine having a tool spindle for driving a finishing tool to rotate about a tool axis and at least one workpiece spindle for driving a pre-toothed workpiece to rotation, the method comprising:

detecting a plurality of measurement values, the measurement values being values of a power indicator which indicates a current power consumption of the tool spindle while the finishing tool is in machining engagement with a workpiece;

applying a normalization operation to the measurement values or to values of a quantity derived from the measurement values to obtain normalized values, the normalization operation depending on one or more process parameters, the normalization operation causing the normalized values to have a reduced dependency on the process parameters, the process parameters being selected from geometric parameters of the finishing tool, geometric parameters of the workpiece and setting parameters of the finishing machine, the normalization operation being based on a model of process force or process power describing an expected dependence of the measurement values on the process parameters;

analyzing the normalized values to detect impermissible process deviations; and removing a workpiece for which an impermissible process deviation has been determined.

2. The method according to claim 1, wherein the normalization operation is performed in real time while the finishing tool is in machining engagement with the workpiece.

3. The method according to claim 2, wherein the normalized values are analyzed in real time to detect the impermissible process deviations.

4. The method according to claim 1, comprising: recalculating the normalization operation when at least one of the process parameters has changed, using the model of process force or process power.

5. The method according to claim 1, comprising: calculating at least one characteristic parameter of the machining process from the measurement values or values derived from them.

6. The method according to claim 5, wherein the at least one characteristic parameter correlates with a predefined machining error of the workpiece.

7. The method according to claim 6, comprising: performing a gear measurement for selected workpieces to determine at least one gear measurement value per workpiece which characterizes the predefined machining error; and determining correlation parameters that characterize a correlation of the at least one characteristic parameter with the at least one gear measurement value.

8. The method according to claim 6, wherein the calculation of the at least one characteristic parameter comprises a spectral analysis of measurement values or values derived therefrom to obtain a plurality of spectral components.

9. The method according to claim 8, wherein the machining process is a generating process in which the finishing tool and the workpiece are in rolling engagement, and wherein the at least one characteristic parameter comprises at least one of the following variables:

a cumulative pitch indicator, wherein the cumulative pitch indicator is calculated from a spectral component at a rotation frequency of the workpiece spindle and correlates with a cumulative pitch error or concentricity error of the workpiece;

a wear indicator, wherein the wear indicator is calculated from a low-frequency spectral component and correlates with a degree of wear of the finishing tool; and a profile shape indicator, wherein the profile shape indicator is calculated from a spectral component at a tooth mesh frequency and correlates with a profile shape deviation of the workpiece.

10. The method according to claim 6, comprising: storing a data set in a database, wherein the data set comprises a unique identifier of the workpiece, at least one process parameter and the at least one characteristic parameter.

11. A method for monitoring a machining process in which tooth flanks of pre-toothed workpieces are machined with a finishing machine, the finishing machine having a tool spindle for driving a finishing tool to rotate about a tool axis and at least one workpiece spindle for driving a pre-toothed workpiece to rotation, the method comprising:

detecting a plurality of measurement values, the measurement values being values of a power indicator which indicates a current power consumption of the tool spindle while the finishing tool is in machining engagement with a workpiece;

applying a normalization operation to the measurement values or to values of a quantity derived from the measurement values to obtain normalized values, the normalization operation depending on one or more process parameters, the normalization operation causing the normalized values to have a reduced dependency on the process parameters, the process parameters being selected from geometric parameters of the finishing tool, geometric parameters of the workpiece and setting parameters of the finishing machine, the normalization operation being based on a model of process force or process power describing an expected dependence of the measurement values on the process parameters;

calculating at least one characteristic parameter of the machining process from the normalized values, the at least one characteristic parameter correlating with a predefined machining error of the workpiece;

performing an analysis of values of the at least one characteristic parameter for a plurality of workpieces to determine a process deviation;

changing the machining process to reduce the process deviation.

12. The method according to claim 11, wherein the analysis is performed by a trained machine learning algorithm.

13. The method according to claim 11, wherein the analysis comprises:

correlating values of the at least one characteristic parameter for a plurality of workpieces with another parameter of the machining process.

14. The method according to claim 6, comprising:

graphical outputting of values of the at least one characteristic parameter or values derived therefrom for a plurality of workpieces.

15. The method according to claim 1, wherein the recalculation of the normalization operation comprises a compensation with respect to a variable dimension of the finishing tool.

16. A finishing machine for the machining of tooth flanks of pre- toothed workpieces, comprising:

a tool spindle for driving a finishing tool about a tool axis to rotate;

at least one workpiece spindle for driving a pre-toothed workpiece to rotate;

a machine control device comprising a control computer and a plurality of axis modules for controlling a process of machining the workpiece with the finishing tool; and software which, when executed on one or more processors, causes the one or more processors to carry out a method comprising:

detecting device for detecting a plurality of measurement values while the finishing tool is in machining engagement with a workpiece, the detected measurement values being values of a power indicator which indicates a current power consumption of the tool spindle;

applying a normalization operation to at least part of the measurement values or to values of a quantity derived from the measurement values to obtain normalized values, the normalization operation depending on one or more process parameters, the normalization operation causing the normalized values to have a reduced dependency on the process parameters, the process parameters being selected from geometric parameters of the finishing tool, geometric parameters of the workpiece and setting parameters of the finishing machine, the normalization operation being based on a model of process force or process power describing an expected dependence of the measurement values on the process parameters;

analyzing the normalized values in order to detect impermissible process deviations; and removing a workpiece for which an impermissible process deviation has been determined.

17. The finishing machine according to 16, wherein the normalization operation is performed in real time while the finishing tool is in machining engagement with the workpiece.

18. The finishing machine according to claim 16, wherein the normalized values are analyzed in real time in order to detect the impermissible process deviations.

19. The finishing machine according to claim 16, wherein the method comprises:

recalculating the normalization operation when at least one of the process parameters has changed, using the model of process force or process power.

20. The finishing machine according to claim 16, wherein the method comprises:

calculating at least one characteristic parameter of the machining process from the measurement values or values derived therefrom, wherein the at least one characteristic parameter correlates with a predefined machining error of the workpiece.

21. The finishing machine according to claim 20, wherein calculating the at least one characteristic parameter comprises carrying out a spectral analysis of measurement values or values derived therefrom.

22. The finishing machine according to claim 20, wherein the method comprises:

transmitting a data set to a database, the data set comprising a unique identifier of the workpiece, at least one process parameter and the at least one characteristic parameter.

23. The finishing machine according to claim 20, wherein the method comprises:

detecting a process deviation of the machining process from a target process on the basis of values of the at least one characteristic parameter for a plurality of workpieces.

24. The finishing machine according to claim 23, wherein detecting a process deviation comprises executing a trained machine learning algorithm to detect the process deviation.

25. The finishing machine according to claim 16, wherein the recalculation of the normalization operation comprises a compensation with respect to a dimension of the finishing tool.

26. A non-transient computer-readable medium on which a computer program is stored, the computer program comprising instructions which cause a process monitoring device in a finishing machine to perform a method according to claim 1.

27. The method according to claim 8, wherein the spectral components are evaluated at multiples of the rotation frequency of the tool spindle and/or the workpiece spindle.

28. The method according to claim 1, wherein the recalculation of the normalization operation comprises a compensation with respect to a variable outside diameter of the finishing tool.

29. The method according to claim 1, wherein the machining process is a continuous generating process, wherein the finishing tool is a grinding worm, and wherein the pre-toothed workpieces are machined in rolling engagement with the grinding worm.

30. The method according to claim 29, comprising:

dressing the grinding worm, whereby an outside diameter of the grinding worm is reduced; and recalculating the normalization operation after dressing, using the model of process force or process power, based on the reduced outside diameter of the grinding worm.

31. The method according to claim 1, wherein the normalization operation comprises multiplying the measurement values or the values of the quantity derived from the measurement values by a normalization factor.

32. The method according to claim 11, comprising:

recalculating the normalization operation when at least one of the process parameters has changed, using the model of process force or process power.

33. The method according to claim 11, wherein the machining process is a continuous generating process, wherein the finishing tool is a grinding worm, and wherein the pre-toothed workpieces are machined in rolling engagement with the grinding worm.

34. The method according to claim 33, comprising:

dressing the grinding worm, whereby an outside diameter of the grinding worm is reduced; and recalculating the normalization operation after dressing, using the model of process force or process power, based on the reduced outside diameter of the grinding worm.

35. The method according to claim 11, wherein the normalization operation comprises multiplying the measurement values or the values of the quantity derived from the measurement values by a normalization factor.

36. The finishing machine according to claim 16, wherein the finishing machine is a continuous generating grinding machine, wherein the finishing tool is a grinding worm, and wherein the finishing machine is configured to machine the pre-toothed workpiece in rolling engagement with the grinding worm.

37. The finishing machine according to claim 36, comprising a dressing device, wherein the method comprises:

dressing the grinding worm, whereby an outside diameter of the grinding worm is reduced; and recalculating the normalization operation after dressing, using the model of process force or process power, based on the reduced outside diameter of the grinding worm.

38. The finishing machine according to claim 16, wherein the normalization operation comprises multiplying the measurement values or the values of the quantity derived from the measurement values by a normalization factor.

* * * * *